United States Patent
Nolting et al.

(10) Patent No.: US 6,351,453 B1
(45) Date of Patent: Feb. 26, 2002

(54) INTERNET SERVICE PROVIDER (ISP) FINDER

(75) Inventors: Thomas A. Nolting, Holliston; Karen Dion, Dudley; Richard LaPearl, Princeton; Sheila Noonan, Falmouth, all of MA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 09/188,679

(22) Filed: Nov. 10, 1998

Related U.S. Application Data

(63) Continuation-in-part of application No. 09/048,102, filed on Mar. 26, 1998.

(51) Int. Cl.$^7$ .......................... H04M 15/00; H04J 1/16; H04L 5/12
(52) U.S. Cl. ...................... 370/234; 370/232; 370/233; 379/112.01; 379/133
(58) Field of Search ................................. 379/112, 113, 379/133, 134, 135, 34, 265, 266, 309, 111; 370/229, 230, 231, 232, 233, 237, 235, 236, 234

(56) References Cited

U.S. PATENT DOCUMENTS

| | | |
|---|---|---|
| 4,456,788 A | 6/1984 | Kline et al. |
| 4,760,594 A | 7/1988 | Reed |
| 5,285,494 A | 2/1994 | Sprecher et al. |
| 5,333,183 A | 7/1994 | Herbert |
| 5,359,649 A | 10/1994 | Rosu et al. |
| 5,425,087 A | 6/1995 | Gerber et al. |
| 5,434,845 A | 7/1995 | Miller |
| 5,438,570 A | 8/1995 | Karras et al. |
| 5,457,729 A | 10/1995 | Hamann et al. |
| 5,475,732 A | 12/1995 | Pester, III |
| 5,483,590 A | 1/1996 | Chiu et al. |
| 5,563,930 A | 10/1996 | Pester, III |
| 5,579,371 A | 11/1996 | Aridas et al. |
| 5,592,530 A | 1/1997 | Brockman et al. |
| 5,642,396 A | 6/1997 | Cowgill |
| 5,692,181 A | 11/1997 | Anand et al. |
| 5,712,908 A | 1/1998 | Brinkman et al. |
| 5,715,294 A | 2/1998 | Pester, III |

(List continued on next page.)

OTHER PUBLICATIONS

"Gentia Software, Section 3: Query and Reporting Tools", by META Group, Inc., *Data Warehousing Tools Bulletin* (Aug. 1997); pp., 3615–3620.

*Primary Examiner*—Curtis Kuntz
*Assistant Examiner*—Rexford N Barnie

(57) ABSTRACT

Specialized telecom network users who burden the network, such as Internet Service Providers (ISPs), are identified by analysis of network traffic data to identify addresses (e.g. telephone numbers) for destinations receiving unique patterns of incoming traffic. For an ISP, in particular, the analysis involves identifying telephone, numbers of destinations receiving a high volume of calls and having connections exhibiting a long average hold time. To further enhance the ISP finder analysis, the call data may be examined to confirm that there is no outgoing call traffic from any station associated with the candidate ISP numbers. When numbers are identified by the call data analysis, a technician can call each number and listen for a modem tone, as a confirmation that each candidate number actually is of a data service, such as an ISP. Similar methodologies can identify destination numbers for other unique service providers, such as credit card verification services. The preferred embodiments utilize automated systems to compile and analyze call records from standard messages of a telephone network, such as interoffice signaling messages or automated accounting messages.

40 Claims, 7 Drawing Sheets

U.S. PATENT DOCUMENTS

| | | |
|---|---|---|
| 5,724,584 A | 3/1998 | Peters et al. |
| 5,737,399 A | 4/1998 | Witzman et al. |
| 5,757,895 A | 5/1998 | Aridas et al. |
| 5,768,352 A | 6/1998 | Elliott et al. |
| 5,774,530 A | 6/1998 | Montgomery et al. |
| 5,793,839 A | 8/1998 | Farris et al. |
| 5,802,145 A | 9/1998 | Farris et al. |
| 5,809,120 A | 9/1998 | Montgomery et al. |
| 5,825,769 A | 10/1998 | O'Reilly |
| 5,828,729 A | 10/1998 | Clermont et al. |
| 5,835,583 A | 11/1998 | Hetz et al. |
| 5,838,682 A * | 11/1998 | Dekelbaum et al. ........ 370/401 |
| 5,838,769 A | 11/1998 | McNeil et al. |
| 5,844,981 A | 12/1998 | Pitchford et al. |
| 5,850,426 A | 12/1998 | Watkins et al. |
| 5,852,819 A | 12/1998 | Beller |
| 5,854,834 A | 12/1998 | Gottlieb et al. |
| 5,854,835 A | 12/1998 | Montgomery et al. |
| 5,864,608 A | 1/1999 | Brownmiller et al. |
| 5,867,558 A | 2/1999 | Swanson |
| 5,867,565 A | 2/1999 | Morikawa |
| 5,875,238 A | 2/1999 | Glitho et al. |
| 5,881,140 A | 3/1999 | Gerault et al. |
| 5,896,445 A * | 4/1999 | Kay et al. .................... 379/135 |
| 5,901,208 A | 5/1999 | Jabbarnezhad |
| 5,905,785 A * | 5/1999 | Dunn et al. .................. 379/113 |
| 5,905,985 A | 5/1999 | Malloy et al. |
| 5,907,603 A | 5/1999 | Gallagher et al. |
| 5,917,898 A | 6/1999 | Bassa et al. |
| 5,933,490 A * | 8/1999 | White et al. ................. 379/221 |
| 5,937,042 A | 8/1999 | Sofman |
| 5,940,471 A | 8/1999 | Homayoun |
| 5,949,862 A | 9/1999 | Fukuzawa et al. |
| 5,999,604 A | 12/1999 | Walter |
| 6,011,838 A * | 1/2000 | Cox ........................... 379/113 |
| 6,052,447 A * | 4/2000 | Golden et al. .............. 379/114 |
| 6,052,448 A | 4/2000 | Janning |
| 6,067,354 A | 5/2000 | Bauer et al. |
| 6,075,848 A | 6/2000 | Lunn et al. |
| 6,078,647 A * | 6/2000 | D'Eletto ...................... 379/34 |
| 6,112,238 A | 8/2000 | Boyd et al. |
| 6,141,412 A | 10/2000 | Smith et al. |

\* cited by examiner

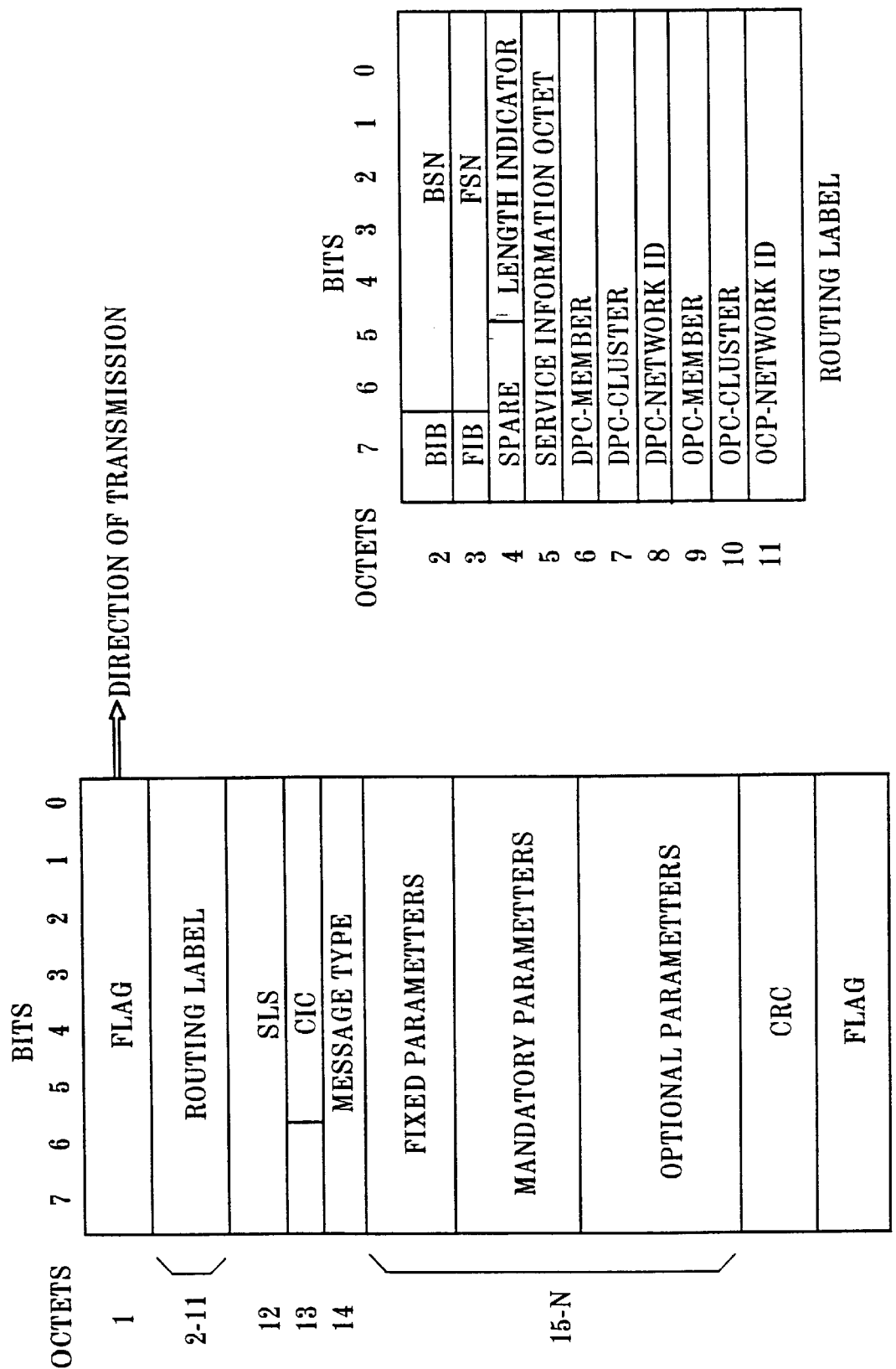

INTERNET SERVICE PROVIDER (ISP) FINDER

CROSS-REFERENCE TO RELATED APPLICATION

This application is a continuation-in-part of U.S. patent application Ser. No. 09/048,102 filed on Mar. 26, 1998 entitled NETWORK PLANNING TRAFFIC MEASUREMENT PROGRAM, the disclosure of which is entirely incorporated herein by reference.

TECHNICAL FIELD

The present invention relates to methods and systems for analyzing call specific data records for traffic through a telecommunication network in order to identify specific types of called parties, particularly ISPs.

ACRONYMS

The written description uses a large number of acronyms to refer to various services, messages and system components. Although generally known, use of several of these acronyms is not strictly standardized in the art. For purposes of this discussion, acronyms therefore will be defined as follows:
Address Complete Message (ACM)
Asynchronous Digital Subscriber Line (ADSL)
ANswer Message (ANM)
Application Service Part (ASP)
Automatic Message Accounting (AMA)
Automatic Number Identification (ANI)
BellCore AMA Format (BAF)
Carrier Access Billing System (CABS)
Call Detail Record (CDR)
Carrier Identification Code (CIC)
Centi-Call Second (CCS)
Central Office (CO)
Competitive Local Exchange Carrier (CLEC)
Common Channel Interoffice Signaling (CCIS)
Common Language Location Identifier (CLLI)
Comma Separated Values (CSV)
Customer Record Information System (CRIS)
Cyclic Redundancy Code (CRC)
Destination Point Code (DPC)
End Office (EO)
Executive Information System (EIS)
Fill In Signal Unit (FISU)
First-In, First-Out (FIFO)
Global Title Translation (GTT)
Graphical User Interface (GUI)
Initial Address Message (IAM)
Integrated Service Control Point (ISCP)
Integrated Services Digital Network (ISDN)
ISDN User Part (ISDN-UP or ISUP)
Inter-exchange Carrier (IXC)
Internet Service Provider (ISP)
Landing Zone (LZ)
Line Identification Data Base (LIDB)
Link Service Signaling Unit (LSSU)
Local Area Network (LAN)
Local Exchange Carrier (LEC)
Loop Maintenance Operations Systems (LMOS)
Message Processing Server (MPS)
Message Signaling Unit (MSU)
Message Transfer Part (MTP)
Multi-Dimensional DataBase (MDDB)
Numbering Plan Area (NPA)
Office Equipment (OE)
Online Analytical Processing (OLAP)
Origination Point Code (OPC)
Operations, Maintenance Application Part (OMAP)
Percentage Internet Usage (PIU)
Personal Computer (PC)
Public Switching Telephone Network (PSTN)
Release Complete Message (RLC)
Release Message (REL)
Revenue Accounting Office (RAO)
Service Control Point (SCP)
Service Switching Point (SSP)
Signaling Link Selection (SLC)
Signaling System 7 (SS7)
Signaling Point (SP)
Signaling Transfer Point (STP)
Structured Query Language (SQL)
Transaction Capabilities Applications Part (TCAP)
Wide Area Network (WAN)

BACKGROUND ART

Rapid changes and increases in demand for telecommunication services increase the pressures for cost effective engineering and upgrading of the telephone network. The demand for traditional telephone service continues to increase, but at a steady and readily predictable pace. Several newer types of traffic through the telephone network, however, are increasing at an exponential rate and impose new traffic patterns that exacerbate difficulties in meeting the new traffic demands. The most significant and burdensome of these new types of traffic relates to calls through the telephone network to Internet Service Providers (ISPs), to allow callers to access the Internet.

The most common form of Internet access relies on modems and analog telephone network connections. A modem of this type modulates data from a personal computer (PC) for transmission in the voice telephone band over a telephone connection to the Internet Service Provider (ISP) and demodulates data signals received from the ISP over such a link. The analog telephone modem operates at one subscriber premises end of a voice grade line to transmit and receive signals over the line and through the telephone switch network to and from another similar line and modem in communication with an ISP's host equipment.

To access the Internet, the user activates her PC and modem to dial a number for the ISP. The telephone network switches the call through to a line going to a modem pool operated by the ISP. Once connected through the telephone network, the user logs on, and the ISP's equipment provides communications over the worldwide packet switched network now commonly known as the Internet. This telephone-based operation provides the voice grade analog modem a unique power, the necessary connections for Internet access are virtually ubiquitous. Such modems allow users to call in from virtually any telephone line or wireless telephone (e.g. cellular) almost anywhere in the world.

However, the calling patterns for this type of data communications, particularly Internet access, are radically different from those of normal voice traffic. The sudden increase in popularity of access to the Internet and the difference in call-in traffic patterns have radically changed the loading placed on the telephone network.

Normal voice telephone calls tend to occur at random times, and the network typically routes the majority of such calls to random destinations. Also, the average hold times for such calls tend to be short, e.g. three minutes or less. By contrast, Internet traffic tends to have severe peak traffic times during any given twenty-four hour period, e.g. from 8:00 PM to 11:00 PM. Also, the network must route Internet access calls to a very small number of destinations, i.e. to the lines for modem pools operated by Internet Service Providers (ISPs). Instead of many parties calling each other randomly, many callers are all calling in to a limited number of service providers. Finally, hold times for Internet calls can last for hours. Some Internet users access the Internet when they sit down at their desks and leave the call connections up until they decide to turn their computers off, e.g. at the end of their day. If they leave their computers on all the time, the connections to the ISPs may stay up for days. These Internet traffic patterns add incredibly heavy traffic loads to the telephone network and tend to concentrate those loads in specific offices providing service to the ISPs.

The local exchange carriers (LECs) are considering a number of different options for relieving the congestion caused by Internet access traffic. Using existing technologies, these options include deploying more switches and trunk circuits and designing the connections of switches and trunks to the ISPs and their high-end users to minimize call switching and/or trunk congestion. For example, if there is a heavy concentration of ISP bound calls from a mid-town end office switch to an end office in the suburbs that serves the ISP, the LEC might install additional direct trunks between those offices to reduce the need for overflow routing through a tandem office. Within the mid-town office switch, the LEC might connect the high-end users that call the particular ISP to the same switch module that connects to the new direct trunks to the suburban end office, in order to reduce the inter-module switching load within the mid-town switch. Similarly, in the suburban office, the LEC would connect the new trunks to the same switch module that serves the ISP.

The carriers also are considering and experimenting with a number of options to off-load the Internet access traffic from the voice telephone network. Such options range from deployment of dedicated trunks to the modem pools of the ISPs to deployment of advanced digital loop carrier systems that can recognize data calls and switch such calls over to some link directly to a fast packet network. Other technologies, such as Asynchronous Digital Subscriber Line (ADSL) networks, provide a totally separate logical path for the data communications.

The various strategies intended to address the increasing traffic demands of Internet access, such as adding end offices, deploying specialized switching modules, installing ADSL networks, adding trunks, deploying more tandem offices and the like, all require considerable expense by the carriers. Accurate engineering, to minimize cost and yet reduce congestion and provide effective service to the various customers, becomes ever more essential. To provide effective engineering, it is necessary that the carrier understand the traffic involved. Such understanding requires accurate and complete traffic measurement. Accurate information also is necessary to resolve disputes, for example with the ISPs over service quality.

Understanding the loading caused by access calls to ISPs begins with identifying the ISPs. Large Internet Service Providers, such as America On-Line are known, both to the public and to the local exchange carriers. However, many smaller operators come and go in the ISP business. Typically, a company approaches a local carrier and subscribes to a number of business lines in a multi-line hunt group. A typical business connects telephone equipment to the lines, but unbeknownst to the carrier, an ISP connects a pool of modems to the lines. The company's customers call the main number of the hunt group, and the telephone network routes the calls to the next available line in the group. The carrier often does not know the type of business that the company operates, in this case, that the company is another ISP.

A need therefore exists for an effective technique to measure and analyze unique traffic patterns, particularly as they relate to Internet access calls. A more specific need is for a technique to measure traffic, identify characteristic traffic patterns and determine therefrom the destinations serving as access points for otherwise unknown ISPs.

A number of techniques have been developed for monitoring operations of the public switching telephone network. While these prior techniques may be effective for some purposes, they have not proven effective for analyzing Internet access traffic or recognizing ISPs. To complete the understanding of the background of the invention, it may be helpful to briefly consider some of the prior techniques for network monitoring.

U.S. Pat. No. 5,475,732 Pester describes an SS7 Network Preventative Maintenance System for detecting potential SS7 and switched network troubles, automatically analyzing the troubles, and providing alarm and corrective action to avoid major network events. The Pester SS7 Real Time Monitor System described in that Patent is a multi-stage SS7 network preventative maintenance tool that traps SS7 messages, detects potential SS7 and switched network troubles, automatically analyzes those troubles, and provides alarm and corrective action instructions to maintenance personnel.

U.S. Pat. No. 5,592,530 to Brockman et al. relates to an SS7 monitoring system for evaluating the operations of telephone switches by capturing data between signaling nodes of a telephone switching system. The Brockman et al. surveillance equipment captures signaling information from different signaling network paths within a mated STP pair and correlates the fragmented messages for each monitored call. The system is capable of generating call detail records from the SS7 messages of a mated pair cluster, for use in billing and fraud detection.

While the above discussed Pester and Brockman et al. Patents describe the usefulness of monitoring an SS7 common channel interoffice signaling network for event detection, neither of these patents is directed to the particular problems of traffic measurement addressed by the present invention. The Pester Patent places emphasis on monitoring of the SS7 network itself in order to detect troubles in its functioning. The Brockman et al. Patent focuses on monitoring of all links to the STPs in a pair and the assembly of related SS7 signaling messages to form a record of call completions.

While these methodologies may be effective for their stated purposes there remains a distinct need for an efficient and effective tool for monitoring and analyzing types of traffic through the telephone network, to recognize unique patterns and identify key users involved in such traffic patterns. Attempts to use other more traditional approaches, such as the accumulation of data from the switches themselves and the Engineering and Administrative Data Acquisition System fell short of providing the desired information.

For example, today, a LEC conducts studies on usage in an office by setting up a "busy study" with respect to specific individual lines served through that office. It is not possible to look at all the traffic in the office at one time. Typically, the LEC can study maybe three different lines at a time. So in a 50,000-line office the LEC engineers can examine the traffic for up to three hundred lines at one time. Also, setting up and maintaining such studies are labor intensive. To conduct a meaningful number of studies throughout a large service area, a LEC virtually needs an army of clerical people whose main job function is setting up busy studies. Once set up, such a study may run for three weeks, but at the end of that time, it takes another two weeks to process the output and organize the results into a report. Results are not available in real-time. Even when results do become available, the study only shows data on a few lines that may or may not be causing blockage in the busy hour. If the lines were not properly selected, the busy study may be virtually meaningless to the network engineer trying to relieve congestion through the office. Also, traffic patterns are changing rapidly, e.g. as new ISPs obtain lines and go into service in already congested areas. As a result, by the time the engineer accumulates enough data to work with, the data may already by obsolete.

It is accordingly an object of this invention to provide a relatively low cost solution to those problems.

It is another object of the invention to provide a timely, powerful, cost effective means of analyzing traffic on the Public Switching Telephone Network (PSTN) to identify unique traffic patterns and the parties involved in such patterns.

It is a further object of the invention to provide a flexible, expedient, accurate, and cost effective method to identify individual destinations (numbers and/or lines) contributing to network blockage. Specifically, it is an object of the invention to provide such a technique to identify numbers or lines associated with Internet Service Providers (ISPs).

It is yet another object of the invention to implement Internet Service Provider (ISP) studies and enable better service to ISP customers while maintaining optimal network utilization.

DISCLOSURE OF THE INVENTION

The invention address the above stated needs by providing effective techniques for tracking traffic through a telecommunication network. The invention encompasses both methods and apparatus for processing records of calls through the network to develop useful data representing patterns of traffic. The invention involves analysis of such data to recognize unique patterns and identify certain types of called parties (e.g. ISPs) from those patterns.

The call records are developed from monitoring or compiling of items of information from certain management data messages used by the network. Management data here refers to information generated by the telecommunication network for its operations purposes, for example, interoffice signaling messages generated to control call set-up and tear-down. Another example of such data would be messages sent from central offices of the network to an accounting office, for record keeping and billing purposes.

In one example of the inventive method, analysis of the call records may identify destinations having a high volume of in-bound traffic. For such destinations, the average hold time or the underlying parameters relating to hold time can be examined.

For ISPs, for example, the average hold time (connect time divided by number of calls) tends to be rather long. If measured using all calls to the numbers (uncompleted as well as completed) the average hold time for ISP calls is greater than eight minutes. If measured using completed calls to the number, the average hold times are even longer.

Other types of high traffic destinations exhibit different unique hold time. For example, credit card verification systems typically exhibit a very short average hold time, e.g. less than one minute.

Thus, one aspect of the invention relates to a method involving analysis of data records of calls through a telecommunication network. This analysis identifies destination telephone numbers receiving a high volume of incoming traffic. For the identified destination numbers, data records for calls to those numbers are analyzed to determine the number of calls made to each of the identified numbers and the total amount of connect time for calls to each of the identified numbers. The method collects a subset of the identified numbers. Specifically, the number of calls and the total amount of connect time for calls to numbers in the subset satisfy criteria indicating a target traffic pattern. For example, the connect time and number of calls may indicate a long hold time, e.g. for a target pattern of calls to an ISP.

The present invention identifies destination numbers having an excessive number of incoming calls during some interval, typically an excessive number of calls per day or an excessive number of calls during an hour identified as the peak busy hour for network traffic. In operation, the invention identifies destination addresses or numbers associated with a number of calls during the interval that exceeds a threshold. In one example, the threshold is an arbitrarily selected number representing a high volume of in-bound traffic. An alternative is to select some top number of destinations based on traffic, e.g. the fifteen destination numbers with the highest volumes of in-bound traffic. In this alternative approach, the threshold is essentially the traffic volume of the next lower destination, in the example, the number of calls to the destination number with the sixteenth highest volume of in-bound traffic.

The invention contemplates the possible use of further steps to verify the identified destination as a business of the target type. For example, for ISPs, the analysis would include a further check to confirm that there is no outgoing traffic associated with the number identified as a candidate for that of an ISP. If still further verification is desired, a technician can call the number and detect an answer signal from a modem.

Having identified numbers for particular network users, such as ISP candidate numbers, it is possible to enhance the results of the analysis. Thus, in the preferred embodiments, the inventive analysis may also involve accessing reference data. For example, the list of numbers can be matched against numbers of known ISPs, to reduce the subset to new ISP candidate numbers. Another use of the reference data is to translate an item of information from a data record of a call to one number remaining in the candidate subset into descriptive information. The descriptive information may identify an office of the network assigned to provide switching services relating to the number. As another example, the descriptive information may identify a subscriber that has been assigned the number, e.g. the subscriber acting as the ISP.

Another aspect of the invention relates to a system, for use with a telephone network, for identifying destination telephone numbers as candidate numbers believed to be associated with a particular type of business, e.g. with an ISP. The system includes one or more components associated with the network for compiling detailed records of calls processed through a portion of the telephone network. A server system receives and analyzes the detailed records, to identify each destination telephone number satisfying certain predefined criteria. The criteria for each identified number include the following:

1) calls to the number during a predetermined interval exceed a threshold,
2) calls to the number exhibit an average hold time bearing a predetermined relationship to a threshold duration, and
3) there were substantially no outgoing calls from a station associated with the destination number.

The preferred embodiments of the present invention utilize real time monitors on selected SS7 links to collect interoffice signaling messages. A site processor compiles data from the signaling messages relating to individual calls, to form call detail records (CDRs) for all interoffice call attempts. The site processor uploads the CDRs to a central server. Automatic Message Accounting (AMA) records also are accumulated for at least selected central office switching systems and uploaded to a server. The servers maintain two relational databases, one for the CDRs derived from the signaling data, the other for the AMA based call data sets.

Data from the two relational databases is processed or 'prepared' and uploaded to a multi-dimensional database. The data preparation includes supplementing the records with reference data and where necessary spreading or "binning" usage data to multiple tracking intervals. The multi-dimensional database provides on-line analytical processing tools for enhanced processing of the call data and offers an efficient graphical user interface, preferably a web suite type interface. Applications running in the multi-dimensional database enable analysis and presentation of study results to identify particular traffic patterns and end users. One application, for example, is an ISP finder application.

The preferred embodiment of the on-line analytical processing routine comprises a multi-dimensional database with a presentation layer. The presentation layer may be an independent program or an integral element incorporated in a software package with the multi-dimensional database. The presentation layer provides the user interface, for example in the form of a client-server interface or a web-browser interface. The presentation layer offers the user fast and flexible access to the study data.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

FIG. 2A is a diagrammatic illustration of the actual switched telephone network and elements of the inventive system used to capture call management data from that network. FIG. 2B depicts the data processing elements/software of the traffic tracking system.

FIG. 3 illustrates in graphic form the layout of an SS7 message.

FIG. 4 graphically depicts the layout of the routing label portion of the SS7 message of FIG. 3.

DETAILED DESCRIPTION OF THE PREFERRED EMBODIMENTS

The invention involves compiling and analyzing call traffic data, to recognize patterns of calls to certain types of users. In particular, this involves searching for patterns of calls to a certain, limited number of destination telephone numbers and identifying the numbers based upon recognition of the appropriate calling pattern.

Depending on the type of user, the pattern may vary. For a credit validation service, the calling pattern may involve a high volume of incoming calls but exhibit a short average hold time per call. For an ISP, the calling pattern involves a high volume of incoming calls and a long average hold time. If the pattern is consistent with ISP access, there will be no outgoing traffic from a number assigned to an ISP.

Figure 1A:
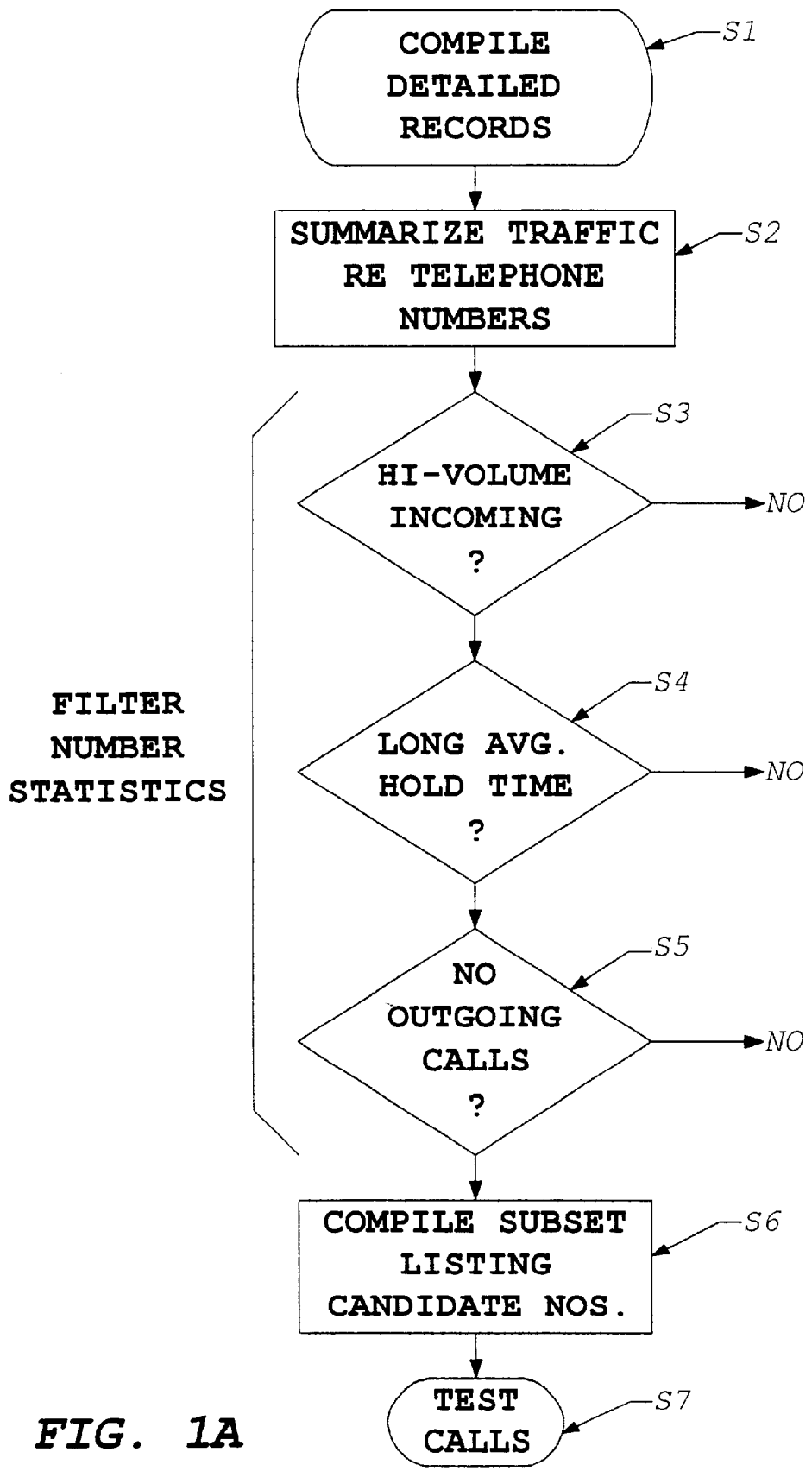
FIG. 1A is a simplified flow chart useful in explaining the high-level concepts involved in a study to find destinations associated with particular types of network users, such as ISPs.

As a prime example of the present invention, FIG. 1A depicts the high-level process flow of a method for finding telephone numbers of ISPs. Preferably, the network operator deploys a system to monitor certain management data messages used by the network. Examples of management data include interoffice signaling messages and messages sent from network offices to an accounting office for record keeping and billing purposes. In a telephone network, the signaling messages typically would be SS7 messages, and the accounting messages would be AMA messages. The first step (S1) of the ISP finder process (FIG. 1A) involves compiling data from the specific monitored messages to form detailed records of calls through the network. In a typical implementation, the results of this step include records for all calls through a selected portion of the network, e.g. through a particular end office suffering congestion related problems.

The detailed call records are processed to create relevant summary information characterizing the call traffic through the selected portion of the network (S2). For example, at this point, the summary data will indicate the number of calls to each destination number as well as the time and duration for each call into or out of an office selected for study.

The finder routine then executes a series of steps to filter the information based on call statistics relative to the users' telephone numbers. This filtering progressively narrows down the set of numbers under consideration until a collection or subset of numbers is developed, where all the numbers collected in the remaining subset exhibit traffic statistics satisfying all of the filter criteria.

In the exemplary ISP finder application, the filter operations collect telephone numbers for which the statistics indicate a high volume of incoming calls, long hold times and no outgoing traffic. Thus, in the process of FIG. 1A, the step S3 serves to identify destination telephone numbers to which the network processed a high-volume of calls. This operation may identify all numbers associated with a volume of incoming calls meeting or exceeding a threshold. Alternatively, the process may select some arbitrary number of destinations having the highest incoming call volumes, e.g. the top fifteen. Data relating to destination numbers having a relatively low volume of incoming calls may be discarded.

From the numbers identified in step S3, the process now identifies those numbers for which the calls exhibited a long average hold time per call (S4). Average hold time associated with one of the numbers is calculated by dividing the total connect time for calls to or from the telephone number by the total number of calls for that number. The total calls may be the count of all calls initiated or the count of all calls completed for that destination number. Again, Data relating to telephone numbers not satisfying the criteria, i.e. having a relatively low average hold time, may be discarded.

At this point, the first two filter steps (S3, S4) have culled the data down to identify a list of those numbers satisfying the criteria for high volume and long hold times. Depending on the level of accuracy desired, this list of candidate numbers may actually be sufficient. However, the procedure may go through another filter operation to determine whether or not there were any outgoing calls associated with each number (S5). This operation deletes numbers for which there were outgoing calls from associated stations. The result at this point (S6) is a small subset listing of the destination numbers found to satisfy all of the filter criteria, i.e. high volume, long average hold time, and no outgoing traffic.

If further confirmation that the numbers are those of ISPs is desired, a carrier technician can make telephone calls to the candidate numbers (S7). If the technician hears a modem answer tone, then the telephone number points to a data device of the type that might be operated by an ISP. Actual tests of the procedure shown in FIG. 1A have produced candidate number lists at S6 that identified ISPs to an accuracy of 95% or better when tested by follow-up calls (S7).

To perform studies in accord with the invention requires efficient collection, preparation and analysis of traffic data for a communication network such as the public switching telephone network. The present invention also encompasses certain specific applications of the traffic tracking technology as applied to the finder studies.

Figure 1B:
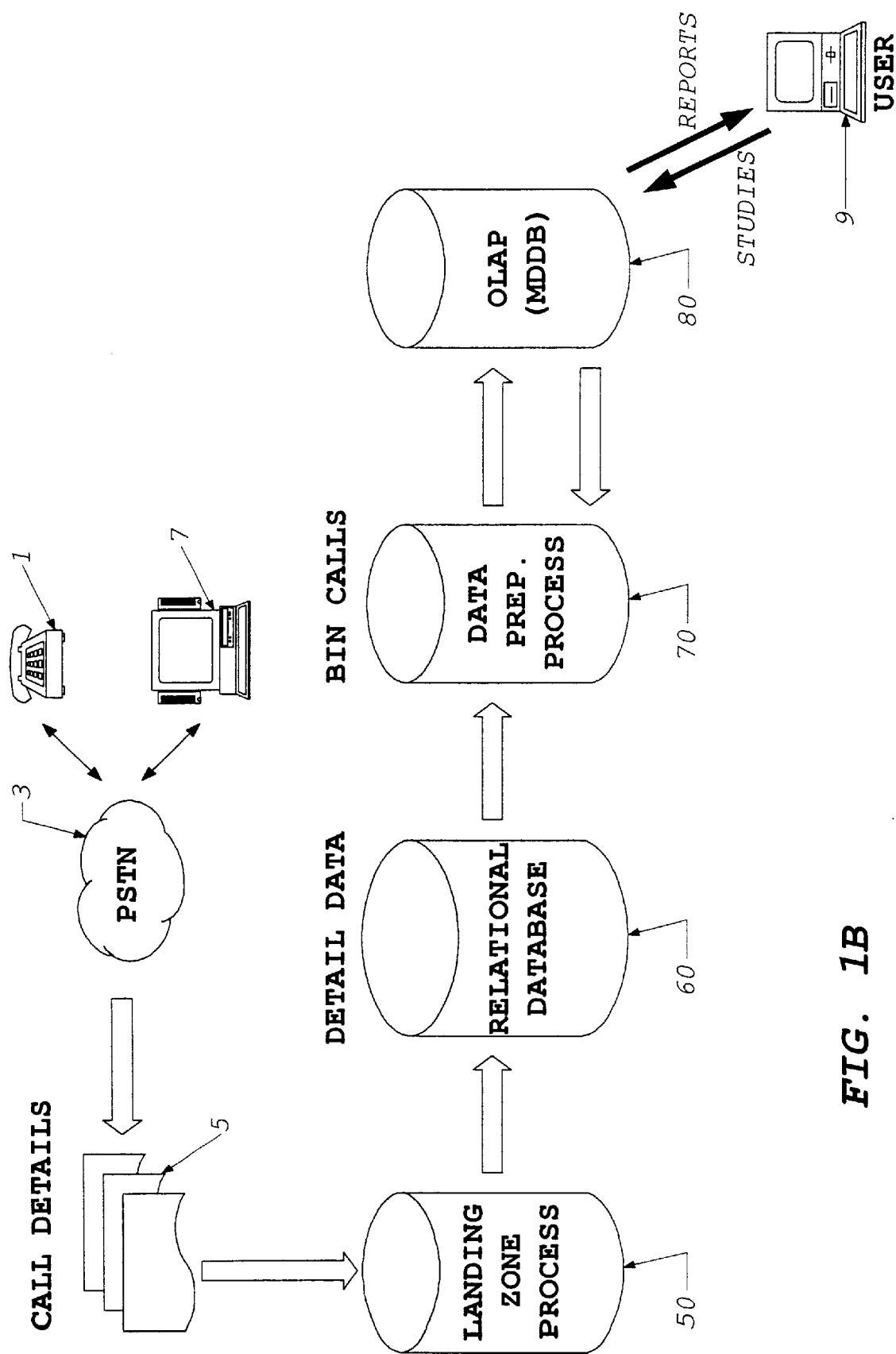
FIG. 1B is a high-level block diagram depicting the preferred methodology for conducting network traffic studies, particularly studies for finding network users in the manner of FIG. 1A.

FIG. 1B provides a high-level illustration of the functions involved in the traffic studies used to find target users whose traffic matches a predetermined pattern. Typically, customers using telephones such as the telephone 1 make calls through the public switching telephone network (PSTN) 3. The PSTN provides switched connections between calling and called stations. In accord with the invention, the network billing equipment and/or certain monitoring equipment in the PSTN 3 accumulates records 5 of the details of the calls. For example, the records may be compiled from SS7 or AMA messages. The call detail 5 for each call includes a wide variety of different items of information about the call, including for example calling and called party numbers, the time of the call, the duration of the call if completed, the type of release if terminated without completion, identification of office(s) serving the call, etc. The PSTN 3 accumulates similar call detail records 5 for calls to and from data devices, such as calls from the personal computer (PC) 7 to ISPs discussed later.

The call details 5 are supplied through a database input procedure 50, referred to as a "landing zone" process. The landing zone serves to format the data and load the call details into appropriate tables in one or more relational databases 60. In the preferred embodiment, the relational database stores call details derived from PSTN billing records and from monitoring of interoffice signaling messages. The finder studies may be based on either one or both of these different types of records compiled and loaded in the relational database 60. The relational database 60 stores the bulk detail data in an accessible form. However, still further processing is needed to allow analysis and output of the results in desired aggregate forms. Data from the relational database 60 is prepared and uploaded in process 70 for input for On-Line Analytical Processing (OLAP) 80, which preferably takes the form of a multi-dimensional database (MDDB) with an integrated presentation layer.

The data preparation process 70 summarizes details of calls and categorizes calls into logical groupings. One other function of the data preparation 70 is categorizing calls into "bins" based on the time and duration of the calls.

The data preparation process 70 also may involve modifying the call details by application of reference data from other sources, such as profile or service information of one of the parties to the call. In this data preparation operation, one purpose is to combine call detail records, for example from AMA or SS7, with external support system data. For the Internet User finder application, this operation might identify the caller's phone number, the associated OE, the trunk number, the trunk group ID, etc. Preferably, this part of the preparation utilizes middleware that takes the form of a relatively universal system, with an interface to other data systems, whether it's for forecasting or for looking at marketing data, demographic data, etc.

The processed call detail information is then uploaded to the OLAP 80. The OLAP process 80 analyzes the prepared call details and compiles data into reports, for output to a user's terminal 9. The OLAP process provides certain study management tools as well as the graphical user interface (GUI). For example, the OLAP system 80 receives the inputs and presents outputs via the user terminal 9, to set up study models, to setup specific studies using established models and to present study results. As noted, the preferred embodiment of the OLAP software is a multi-dimensional database (MDDB)with an integrated presentation layer.

The multi-dimensional database (MDDB) 80 captures and stores high level summary data and displays it through the user terminal 9 in a variety of ways. The MDDB enables the user to overlay multiple dimensions when viewing the data, for example, showing originating traffic from one area code generated during certain hours of the day with an average call holding time greater than a specified threshold. The preferred MDDB offers the manipulation of data in a cube concept, where data can be approached from many different directions, providing different slices or views of the data. The preferred MDDB also uses a "drilling down" feature to slice or roll-up (aggregate) data based on the metrics (Minutes of Use, Average Holding Time, Busy Hour identification, etc.) required. The drill-down feature enables the user to access the raw call detail information, when necessary. As one example of drill-down, having found an ISP, a user might drill-down into the call details to identify originating offices for calls to that ISP or even telephone numbers of subscribers calling that ISP.

The application on the MDDB may also provide another point at which the user may access external reference data. For example, having found candidate numbers for ISPs, the application may compare the numbers to those of known ISPs, and reduce the list to a list of new ISP numbers.

The MDDB allows export of data, e.g. to copy a particular presentation from the MDDB into a spreadsheet such as into Excel. The user can then do his own analysis in Excel.

At a higher level, the MDDB enables presentation of aggregate traffic pattern data. For example, it is possible to display the Internet traffic as a percentage of all traffic out of a particular end office, either based on peg count or usage (e.g. MOU or CCS).

In accord with the preferred embodiment of the invention, an ISP finder application is one of several specific study applications running on the MDDB. The MDDB runs other applications, some of which may use results of the finder study, such as an application to find high-volume Internet users, or a study to analyze trouble reports related to ISP traffic.

Thus, ISP Finder is an application developed in the MDDB system to cull out from the traffic measurements those call records that meet specific criteria consistent with terminating traffic to ISPs. In one version of such an application, for example, one search criteria looks for all telephone numbers receiving more than a threshold number of calls in a time period, e.g. more than 50 calls per day or more than 30 calls in an identified peak busy-hour. The application then determines which of those calls last more than a threshold average duration, e.g. 8 or 9 minutes each. The destination telephone numbers for such calls are then matched against a defined list of known ISPs, and the call detail record is attached to that ISP's data if there is a match. If there is no match to a known ISP telephone number, then the call detail is associated with a category called "New ISP". The user can then view all the telephone number candidates in the New ISP category and any associated detail information of interest, to determine if the numbers in fact point to ISPs or to some other types of high usage service.

An Internet Traffic Analysis application identifies and analyzes originating traffic to the ISPs. The purpose of this application is to quantify Internet usage characteristics—usage trends and distribution, network hot spots, and churn analysis. Analysis of this type allows network planners and engineers to better plan Internet offload strategies, optimize engineering practices and validate economic viability of their recommendations and actions.

Another application identifies Heavy Internet Users. This application helps to identify intensive users of the Internet, such as work-at-home users and telecommuters. These are people who are consistently on the Internet for several hours a day, week after week. Current engineering practices do not design the PSTN for this type of call with long holding times. Once these users are identified, it is possible to engineer network switches and trunks to better balance the traffic load. Information on heavy Internet users also can help to identify and define new services and products geared specifically toward long holding time data calls.

To further enhance the results for certain ISP studies, it may be helpful to analyze other data in the call records. For example, if the intent is to market additional services or advanced services to the ISPs, it may be helpful to also study the blockage patterns for the high-end users found in the basic user finder study.

For this purpose, it is notable that the CDRs developed from the monitoring of SS7 messages include "release codes." Release codes indicate the reasons for call terminations, when calls are not completed as dialed. Examples include user busy, caller check, number change, out of service, facility rejects, etc. The CDRs capture these codes from the SS7 messages, and the traffic track analysis of the present invention can provide a variety of analytical tools and reports, using the release codes. For example, if there is a mass Internet call-in, e.g. because of a release of a report of national interest or the like, the analysis system can indicate how many callers got through and how many did not. For those that did not get through, the system can identify by major categories the principle reasons that calls did not go through, for example the number of calls released because the destination station (user) was busy, the number of calls released because no trunks were available, etc.

The present invention therefore provides effective monitoring of various systems of a public telephone network and processing of the data derived from such monitoring, to enable analysis of various patterns of the traffic through the telephone network. The pattern analysis and recognition identifies destinations associated with certain types of users, such as ISPs. The system then facilitates analysis of traffic through the network to the identified destinations, for various engineering and business purposes. In the preferred embodiments, the monitoring involves capture of interoffice signaling messages and accumulation of certain accounting records, relating to inter-office and intra-office telephone calls through the network. To facilitate understanding of the invention, it may be helpful at this point to review the structure and operation of the telephone network, in some detail.

Figure 2A:
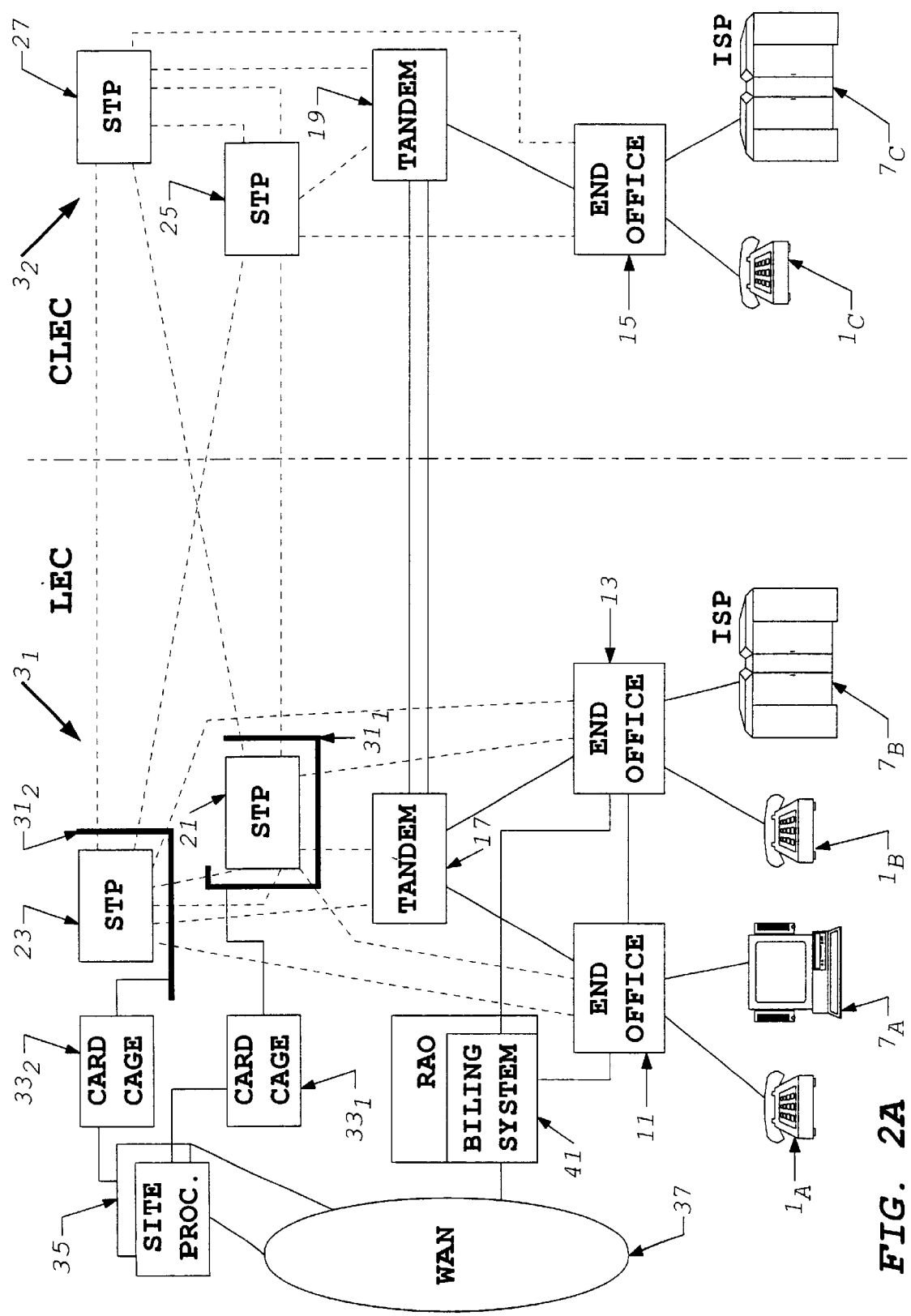
FIGS. 2A and 2B, together, provide a block diagram overview of a public switching telephone network with a traffic tracking system in accord with the invention. Of these two drawings.

Referring to FIG. 2A there is shown a block diagram of a public switching telephone network and the SS7 (signaling system seven) network that carries the call control signaling for the switched network. In reality, the public network that we think of as the telephone network comprises many segments operated by different carriers, including local exchange carriers (LECs) and interexchange carriers (IXCs). For purposes of this discussion, FIG. 2A illustrates two such segments or sub-networks. One sub-network is a network $3_1$, operated by a LEC. The other sub-network could be that of an IXC or any other carrier, but for purposes of this discussion, FIG. 2A depicts a second network or segment $3_2$ operated by a Competitive Local Exchange Carrier (CLEC).

The switched portion of telephone network consists of a series of central office (CO) switches, which are conventionally referred to as signaling points (SPs) in reference to the SS7 network or a service switching points (SSPs) in reference to an intelligent version of the PSTN. Certain of these SPs comprise end offices (EOs) illustrated at 11, 13 and 15 in the drawing. Each signaling point has a point code comprising a 9-digit code assigned to every node in the network. As discussed more later, messages communicated via the SS7 signaling network utilize the codes to identify source and destination SPs, and the traffic tracking system can use these point codes to identify messages relating to traffic through particular offices.

The end offices 11 and 12 represent end offices in the region of one operating company or LEC, whereas the end office 15 represents one of the end offices in the region of a different operating company, in this case a CLEC. Each operating company has its own network ID, which is used as the first three digits of the point codes of the SPs of that carrier's network.

Also, each end office resides within an area assigned NPA digits as an area code. Each exchange is identified by one or more three-digit codes referred to as NXX digits. Each such code corresponds to the NXX digits of an NXX-XXXX (seven-digit) telephone number or the three digits following the three area code digits (NPA) in a ten-digit telephone number. As a result, the NPA-NXX digits of telephone numbers also can serve as identifiers of end offices. Origination and destination telephone numbers appear in various SS7 signaling messages and various records that the offices create for billing and the like.

Digital trunk circuits, shown as solid lines, interconnect the switching offices of each network 3. Typically, within one carrier's network 3₁ end offices, such as end offices 11 and 13, are directly interconnected by trunk circuits. For overflow traffic and/or for connections to other carrier networks, the offices 11 and 13 also connect via trunk circuits to a tandem office 17. In the CLEC network 3₂, the end office 15 connects through a trunk circuit to a tandem 19 or direct to an end office. The LEC and CLEC networks 3₁, 3₂ interconnect through trunk circuits shown for example between the tandems 17 and 19, although end office interconnections are possible.

The present invention relies on monitoring of interoffice signaling messages and of certain records normally associated with billing functions. To understand these monitoring functions it may be helpful to review the signaling and billing record functions of the network. We will first consider interoffice signaling.

The SS7 type interoffice signaling network comprises a series of Signal Transfer Points (STPs) shown here at 21, 23, 25 and 27 and interconnecting data links indicated by dotted lines. Each STP in a network connects to the SP or SSP capable offices in that network via A links. Thus, in the LEC network 3₁, the end offices 11, 13 and the tandem 17 connect to the STPs 21, 23 through A links. Similarly, the end office 15 and the tandem 19, in the CLEC network 3₂, connect to the STPs 25, 27 via A links.

Within the LEC network 3₁, the STPs 21 and 23 constitute a mated pair of STPs connected to each other via C links. Within the CLEC network 3₂, the STPs 25 and 27 also constitute a mated pair connected by C links 58. Each of these mated pairs serves its respective transport area and/or carrier network. Persons skilled in the art will recognize that there may be multiple mated pairs per region or carrier, one pair for each designated transport area.

The STP 21 connects to the STP 25 via a B link, and the STP 21 connects and to the STP 27 via a D link. Similarly, the STP 23 connects to the STP 27 through a B link, and the STP 23 connects and to the STP 25 through another D link. As will be understood, the A, B, C and D links are physically identical links. The letter designations for these various links relate to cost in terms of ease of access.

The STPs in any mated pair have the same translations. Thus, the translations in STP 21 are the same as the translations in STP 23, and the translations in STP 25 are the same as the translations in STP 27. The translations control the message routing through the STP.

The STPs may connect to transactional database systems, such as Service Control Points (SCPs), Integrated Service Control Points (ISCPs) or the like. Such database systems, for example, provide call control information for a wide range of recently developed enhanced features. Other database systems, such as the Line Identification Database (LIDB) provide information for ancillary purposes, for example, for credit card validation, for enhanced versions of Caller ID, etc. The monitoring in accord with the traffic track invention captures messages going to and from the tandems or end offices. This includes messages exchanged between the offices and the database systems. Although possible, for our purposes, it is not necessary at this time to separately monitor the links to the database systems. Therefore, for simplicity of illustration, these databases have been omitted from FIG. 2A.

The present invention relies on capture and processing of the common channel interoffice signaling (CCIS) messages exchanged between offices, during otherwise normal call processing. The invention analyzes considerable information derived from such messages. It may be helpful at this point to consider the preferred protocol for such messages, signaling system seven (SS7), in some detail. A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical application layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, typically for accessing databases such as SCPs. OMAP specifies protocols for certain specialized messages relating to maintenance and operations. Although the tracking system can capture and analyze TCAP and OMAP messages, for purposes of the presently preferred embodiments, the most relevant part is the ISDN-UP, sometimes referred to as "ISUP".

ISDN-UP specifies the procedures and message protocols for setting up and tearing down trunk connections for calls utilizing common channel interoffice signaling (CCIS). ISDN-UP messages, for example, include an Initial Address Message (IAM), an Address Complete Message (ACM) an Answer Message (ANM), a Release Message (REL), and a Release Complete Message (RLC).

SS7 specifies an Application Service Part (ASP) for performing presentation, session and transport layer functions for the TCAP and OMAP protocols. The lower three layers of the SS7 protocol, the network layer, the signaling link layer and the data link layer, form the Message Transfer Part (MTP) of SS7, for the TCAP, OMAP and ISDN-UP protocols. The MTP therefore is common to messages for all applications and provides reliable transfer of signaling messages between network nodes. The MTP relays messages between applications running at different nodes of the network, effectively like a datagram type service.

The SS7 messages comprise digital serial messages that come to an STP for routing. FIG. 3 provides a graphic illustration of an SS7 message packet. The message is arranged in 8 bit bytes or octets representing a start flag, a routing label for MTP processing, certain specialized indicators, the information carried by the message in the form of fixed, variable and optional parameters, and a cyclic redundancy code (CRC) for error correction.

The Message Transport Part (MTP) of the SS7 message is always in the sameplace. Octets 2–11 form the routing label as discussed later with regard to FIG. 4. Octets 15–N contain the actual message, in the form of the fixed parameters, the mandatory parameters and any optional parameters. The lengths of the mandatory parameters field and the optional parameters field are variable.

Several of the traffic tracking studies rely on translation and/or analysis of certain addressing information from the SS7 messages, for example to identify originating offices for calls to newly discovered ISPs. The addressing information used for the MTP and for the traffic analysis appears in the routing label.

FIG. 4, is a graphic illustration of the routing label of the SS7 message packet. The first 7 bits of octet 2 constitute the Backward Sequence Number (BSN). The eighth bit is the Backward Indicator Bit (BIB) which is used to track whether messages have been received correctly. The length of an SS7 message is variable, therefore octet 4 contains a message length indicator. Octet 5 is the Service Information Octet (SIO). This indicates whether it is a Fill In Signal Unit (FISU), Link Service Signaling Unit (LSSU) or Message Signaling Unit (MSU).

The routing label includes fields for both destination related addressing and point of origin addressing. The destination or 'called party' address for the SS7 packet message itself includes octets 6, 7 and 8. Octets 9–11 carry origination point code information, for example member, cluster and network ID information, for the node on the SS7 network sending the message.

In the example shown in FIG. 4, the three octets of the called party address contain an actual destination point code (DPC) identified as DPC-member, DPC-cluster and DPC-network ID information. In operation, the translation tables stored in an STP cause the STP to actually route based on the DPC. The called party address octets (6–8) may carry other types of called party addressing information and receive different treatment by the STP, such as a global title (GTT) and subsystem number (SSN) information. The STP examines the MSU type indicators to determine if there is a need for translation, e.g. from GTT to DPC, before routing the message.

The SS7 network constitutes a highly redundant data network, generally using 56K switched data circuits for the various links to and between the STPs. Because of the redundancy, different signaling messages for a given call may actually transit different routes through the SS7 network.

Returning to FIG. 2A, consider the operation of placing an Internet access call from PC $7_A$ to ISP equipment $7_B$. The user at PC $7_A$ activates the appropriate software routine to initiate dialing of the main number of a hunt group connected from end office 13 to the ISP equipment $7_B$. The SP end office 11 generates an Initial Address Message (IAM) with a destination point code for the end office 13 and an originating point code of the end office 11. The IAM includes a variety of information needed for call set-up, including the dialed number. The end office 11 sends the IAM either to STP 21 or to STP 23. That STP examines the address information and its translations and routes the message offer the next appropriate link, in this case over the A link to the end office 13.

In response to the IAM message, the end office 13 determines whether or not one of the lines in the hunt group corresponding to the dialed number is available. If at least one of the lines is available (not busy), the end office 13 generates an Address Complete Message (ACM) to indicate that it received the request for a call and that the called line is available. The end office 13 sends the ACM message back by simply reversing the origination and destination point codes and sending the message over an A link to one of the STPs 21, 23. The ACM may or may not go over the A link that carried the IAM to the end office 13, and it may go to the other STP of the pair. Again, the STP receiving the message examines the addresses and uses its translations to forward the message over another link to the appropriate destination, in this case the end office 11.

The end office 11 sends ringback tone over the line to the modem in the calling PC $7_A$. At about this time, the end office $7_B$ applies a ringing signal to the line to the called station $7_B$. If the PC $7_A$ provides audio output, the calling party may hear a ringback tone, and the caller and her data equipment await an answer.

The ISP equipment $7_B$ detects the ringing signal, and if operative, that equipment establishes an off-hook condition on the line to answer the incoming call. The end office 13 detects this new condition as an answer and interrupts the ringing signal on that line. The end office 13 also sends an Answer Message (ANS) back through the SS7 network to the end office 11, indicating that the called station $7_B$ has answered.

At that time the necessary trunk circuits between the end offices are connected together and assigned to the call. The trunk connection may run through the tandem 17, which would require separate call set-up and signaling for each leg of the call to and from the tandem. In this example, assume that the trunk connection extends directly between the end offices. The end office 11 connects the line for the PC $7_A$ to the trunk circuit, and the end office 13 connects the line for the ISP equipment $7_B$ to the trunk circuit. At this point a complete voice-grade telephone connection exists between the two data devices, and the data devices can exchange modulated audio signals carrying various data between the user on PC $7_A$ and the internet accessed through equipment $7_B$. Hours later, when one of the parties terminates the sessions, the offices 11, 13 exchange REL and RLC messages via either of the STPs 21, 23 as part of the procedure for tearing down the call connection over the trunk circuit.

The SS7 monitoring system may be implemented on any carrier's portion of the PSTN. In the illustrated example, the LEC network $3_1$ has the monitoring and call detail compilation equipment, for the traffic tracking in accord with the present invention. According to the invention the LEC portion of the public switching telephone network (PSTN) is provided with a traffic monitoring and analyzing system comprising monitors 31, card cages 33 and one or more site processors or servers 35, of the type described in detail in the above discussed Pester Patent. One commercial implementation of such an SS7 monitoring system is currently available from Hewlett Packard, under the product name "AcceSS7".

FIG. 2A shows the sets of monitors or interfaces $31_1$, $31_2$ to the SS7 links to the STPs 21, 23 in diagrammatic form, as solid bold line across respective links. A card cage $33_1$ connects the monitors $31_1$ to a site processor 35. Similarly, a card cage $33_2$ connects the monitors $31_2$ to the same or another site processor 35. The monitors 31 may be conductively or non-conductively coupled to the links to serve as passive interfaces. The card cages 33 connect the monitors 31 to the site processor 35 for accumulation, storage and processing of the raw SS7 messages.

It is intended that multiple monitoring systems of this type serving different purposes may advantageously exist in the PSTN, for example for operations monitoring and/or fraud detection, in addition to the system illustrated from traffic tracking and analysis. For simplicity and clarity, however, only a single system is here illustrated.

The SS7 A link signaling in a completed call typically includes an Initial Address Message (IAM), an Answer Complete Message (ACM), an Answer Message (ANM), as described hereinabove, as well as a Release Message (REL) and a Release Complete Message (RLC). Since the common channel signaling system is intentionally redundant, the messages in a related set may be routed over different A links. In our Internet access example, the IAM may go through STP 21, whereas the ACM and ANM may just happen to go through the STP 23. The REL and RCL messages also may use different links and/or STPs. It is therefore necessary to monitor an appropriate set of links and to reassemble the signaling pertaining to a desired transaction or signaling message set such as for a single call, to provide one call detail record or CDR. This is accomplished in the site processor 35 in a known manner as described in the Pester or Brockman et al. Patents.

It should be noted that the PSTN conducts signaling on all interoffice calls, and the monitoring system traps messages and compiles CDRs for all interoffice calls. In particular, the system provides CDRs for both calls completed to a destination station and calls that terminate without completion. For example, the system accumulates CDRs for calls that are blocked because the called line is busy, because there are no network resources available to the terminating end office (network busy), etc.

With the reassembled message sets the site processor 35 has the data to show the called and calling stations 1A, 1B, the start time of the call, the elapsed time of the call, the originating office, the terminating office and various other detailed data. By monitoring the SS7 signaling for all of the calls originating in, terminating in or passing through a designated switch, such as the switch 13, it is possible to analyze the traffic to identify particularly significant patterns. For example, based on a pattern of calls through the tandem 17 to a certain number, it is possible to identify the number of an ISP 7C, even through that ISP is served through the CLEC switch 15. Knowing that number, it is possible to gather all of the desired information about calls going to the ISP 7C via an interswitch path, including the numbers of calling customers and the number of calls or minutes of use of such calls by each customer. The assemblage of the raw call detail data desired for a particular purpose occurs at the site processor level.

One or more site processors 35 accumulate the CDRs for the traffic monitoring application of the present invention. Periodically, each site processor 35 transmits the latest set of CDRs over a private wide area network (WAN) 37, operated by the LEC for its internal business purposes. The WAN 37 may carry a variety of LEC network operations data. For purposes of the discussion, the WAN transports the CDRs from the site processor 35 to a computer system or server running a relational database 61 (FIG. 2B) for the accumulated SS7 data.

The CDR compilation and forwarding routine in the site processor 35 executes a special procedure for long duration calls. If a call is in progress at the point in time for its programmed uploading to the relational database 61, say midnight, the site processor 35 creates a "call-in-progress" CDR, indicating the start time and duration of the call to that point. Later, when the call ends, the site processor creates another CDR as if the call started at the point in time (midnight) and lasted for the remaining duration of the call from that time until release.

It will be understood that some calls are completed through a single switch, such as a call from a PC (not shown) associated with the telephone 1B through end office switch 13 to the ISP 7B. Such intra-office calls will not generate the above discussed SS7 signaling and thus will not be reflected in the CDRs developed from such signaling. For such intra-switch calls, and for otherwise supplementing the call detail information derived from monitoring the interoffice signaling messages, the invention utilizes data accumulated from certain switch messages normally utilized for billing and other accounting purposes.

Various network elements, such as the switches 11, 13 and/or 17 of the LEC network $3_1$, generate automatic message accounting (AMA) records. Such records are used to provide call details to enable the local exchange carrier to bill for the completed calls, for example to bill the end users, to bill interexchange carriers (IXCs), to bill CLECs, etc. The AMA records may also provide call details for other network operations, e.g. for maintenance purposes.

In operation, a switch examines a customer's service request, typically the destination telephone number, and based on customer profile or service information determines if there is a need for AMA recording for the call. If so, the switch outputs AMA records for significant events in processing of the call. The AMA records are typically in the Bellcore AMA Format (BAF).

The AMA records from the switches go to one or more billing systems 41, typically in a regional accounting office (RAO). The records may be transported to the RAO by physical transport of data tapes, but preferably, each of the switches has an AMA Transmitter (AMAT) or the like coupled to an appropriate data link to allow electronic communication of the records to the RAO. Although shown separately, these data links may be logical links provided through the WAN 37.

In the RAO, the AMA data records are edited and checked for integrity and supplied to the appropriate billing system 41. For this purpose, a message-processing server (MPS) assembles the various entries relating to a call into a completed message. Any incomplete messages are analyzed for administrative purposes and fraud detection. The complete messages are loaded into the billing system 41.

For example, a billing system, which some carriers refer to as the Customer Record information System (CRIS), processes records for end user billing. The CRIS system calculates the monetary amount for each usage event, identifies the appropriate customer's billing account and posts the billable amount to that account. Another common example of a billing system is the Carrier Access Billing System (CABS) which LECs use to process AMA records to calculate and post tariffed charges for other carriers such a cellular companies, IXCs and CLECs.

The billing system 41 may spin-off the AMA data for completed calls, for ancillary purposes. In accord with the invention, the billing system transmits certain completed AMA message data to a server, which maintains an AMA relational database 63. The billing system could transmit the AMA records for all calls through the network, but that would produce a massive amount of data, much of which is unnecessary for studies that are active at any given time. Preferably, the billing system 41 is programmed to forward AMA records only for calls that are pertinent to some on-going traffic track study, for example all calls terminating in an identified end office during a specified study period.

The AMA system typically records call details only for billable calls, e.g. for toll calls but not for flat-rate local calls. However, for purposes of the traffic track studies, translations are established in the switches to accumulate and forward the AMA data for all calls of interest, e.g. for all calls passing through the LEC network $3_1$ coming from or going to the CLEC network $3_2$. Preferably, these added AMA translations are stored in all of the offices 11, 13, 17 but can be turned on or off, as appropriate for particular studies.

As will be understood by those skilled in the art, AMA equipment records call details at each stage of a connection. The calling and called party numbers are registered initially. An answer entry registers the time of connection, and the terminating entry registers the time of disconnect. A common identifier in each entry serves to link the entries relating to a particular call, to distinguish them from those of other calls. The processing of the AMA data in the RAO and billing system 41 assembles the entries for completed calls into complete messages directly analogous to the CDRs produced through SS7 monitoring. Any incomplete messages are analyzed for administrative purposes and fraud detection. For tracking purposes, the billing system 41 delivers the processed AMA call data to the WAN 37. The WAN 37 in turn delivers the data to a central server running the AMA relational database system application 63.

Both the AMA components and the SS7 monitoring components accumulate call detail records. The AMA records relate to each completed call originating or terminating through a switch 11, 13, or 17 having active AMA reporting software. The SS7 records relate to each call (completed or not) through the LEC network $3_1$, which involves interoffice signaling for call set-up. These records for each call take different forms, depending on the equipment accumulating the data, and the two different types of records are uploaded into two different databases 61, 63. Both types of call detail records are essentially flat files, containing detailed information about each call.

In actual operation, the process of loading the flat files for the call detail records into the respective databases 61, 63 involves some initial record collection and management processing, referred to as a landing zone or "LZ" process 50. The LZ 50 manages the incoming CDR data streams, checking for errors and loading the data into the relational database tables. The LZ 50 buffers incoming records and periodically uploads the records into the tables. The records follow a first in, first out (FIFO) logic at the landing zone. Because the two types of call detail records are somewhat different, the landing zone 50 actually comprises two different LZ routines 51, 53.

The illustrated embodiment implements two relational databases 60, 61. An example of appropriate database software is available from Oracle.

A two-dimensional database record is just a flat file. A two-dimensional database has individual tables, created for a given collection. The SS7 relational database 61, for example, stores Call Detail Records (CDRs) for millions of calls relating to a particular traffic study. In a study for traffic to and from the CLEC, the table would contain CDRs compiled from the SS7 messages on the B and D links between the STP pairs. The landing zone process 51 for the SS7 records takes all of those Call Detail Records and loads them into one or more tables set up for the exemplary study. Such a table includes every Call Detail Record and every dimension or piece of information within the individual Call Detail Records in a linear form. As a result of the landing zone processing 51, there is a table, within the table there is CDR 1, CDR 2, etc., and within each CDR there are X dimensions for the X different items of information within each CDR.

The example given above involves loading SS7 CDRs into the relational database 61. It should be noted, however, that an essentially similar landing zone process 53 occurs for loading AMA records into the tables in the AMA relational database 61. The tables consist of flat files for the complete AMA records of each call. The amount of information, the dimensions if you will, are somewhat different than those for the SS7 CDRs. Each AMA record for a call includes similar information, including the calling number, the called number, the duration of the call, the time of the call and some class of service information. However, an AMA record does not include the originating point code or the destination point code.

In the relational databases 61, 63, the call records include study identifiers and a study "type" flag. The identifiers can be used to identify the particular studies to which the records relate. The study type flag indicates the general type of the particular study, e.g. tandem, Internet, CLEC, etc. Preferably, the software running in the site processor(s) 35 and the billing system(s) 41 add the study identifiers and the study "type" flags to the call records before supplying the records through the landing zone procedures to the relational databases.

The basic procedure for identifying ISP numbers may utilize either the SS7 CDRs or the call records developed from the AMA message sets. The preferred embodiment utilizes the AMA message sets, however, a number of related studies utilize the SS7 CDRs to analyze traffic to the ISPs.

According to a preferred embodiment of the invention the relational databases 61, 63 are connected to a processor or server running an OLAP program, preferably in the form of a multi-dimensional database 80. As will be understood by those skilled in the art, an OLAP processor and database is an On-Line Analytical Processing database designed for fast access to summarized data. Using specialized indexing techniques, it processes queries that pertain to large amounts of data and multidimensional views of data much faster than traditional relational databases. Among other things it provides an Executive Information System (EIS) that consolidates and summarizes ongoing transactions within a system to provide a data warehouse. One fact table is surrounded by a series of related tables, which the processor is capable of "drilling into" to obtain additional information.

Multi-dimensional database software providing these capabilities is available from Gentia Software, Inc. of Wakefield Mass. under the product name of Gentia DB. The Gentia DB is a fully OLAP-compliant multidimensional database. Similar to Essbase, it is loaded with data derived from various company data sources, and is pre-consolidated. Gentia supports an "unlimited" number of dimensions, as well as multiple hierarchies within a dimension. It is a fully object oriented visual development environment, with a library of predefined objects, and provides an OLAP database with tools for loading, analysis, querying, and reporting.

Gentia runs on multiple platforms and is scalable across a large system. The multi-dimensional database program could run on a server, and the relational databases 61 and 63 might run on separate servers. Alternatively, two or more of these databases may run within one computer system or server. The server running the multi-dimensional database (MDDB) 81 is accessed by multiple user work stations 9. Although the system may implement a client-server interface, preferably, the database 81 provides a web suite 85 for a user interface, enabling access using standard browser software in the workstations. The actual server may connect directly to the terminals 9 or communicate therewith through a data network, such as a private LAN or WAN or the Internet.

The relational databases 61, 63 just store raw call record data. From the relational databases, the AMA and SS7 CDR data goes through processing referred to as "data preparation" 71. The data preparation step enriches the data.

As noted, the MDDB 81 may run on the same computer system that runs one or both of the relational databases 61, 63. Logically, the data preparation software 71 runs as a separate (e.g. Oracle) relational database. The MDDB is platform independent and may reside in the same server as the relational database or in a separate server. The data preparation software accesses records from each relational database and uploads the prepared data to the MDDB. The MDDB processes data from those records to generate analytical tables, reports and graphs.

Figure 5:
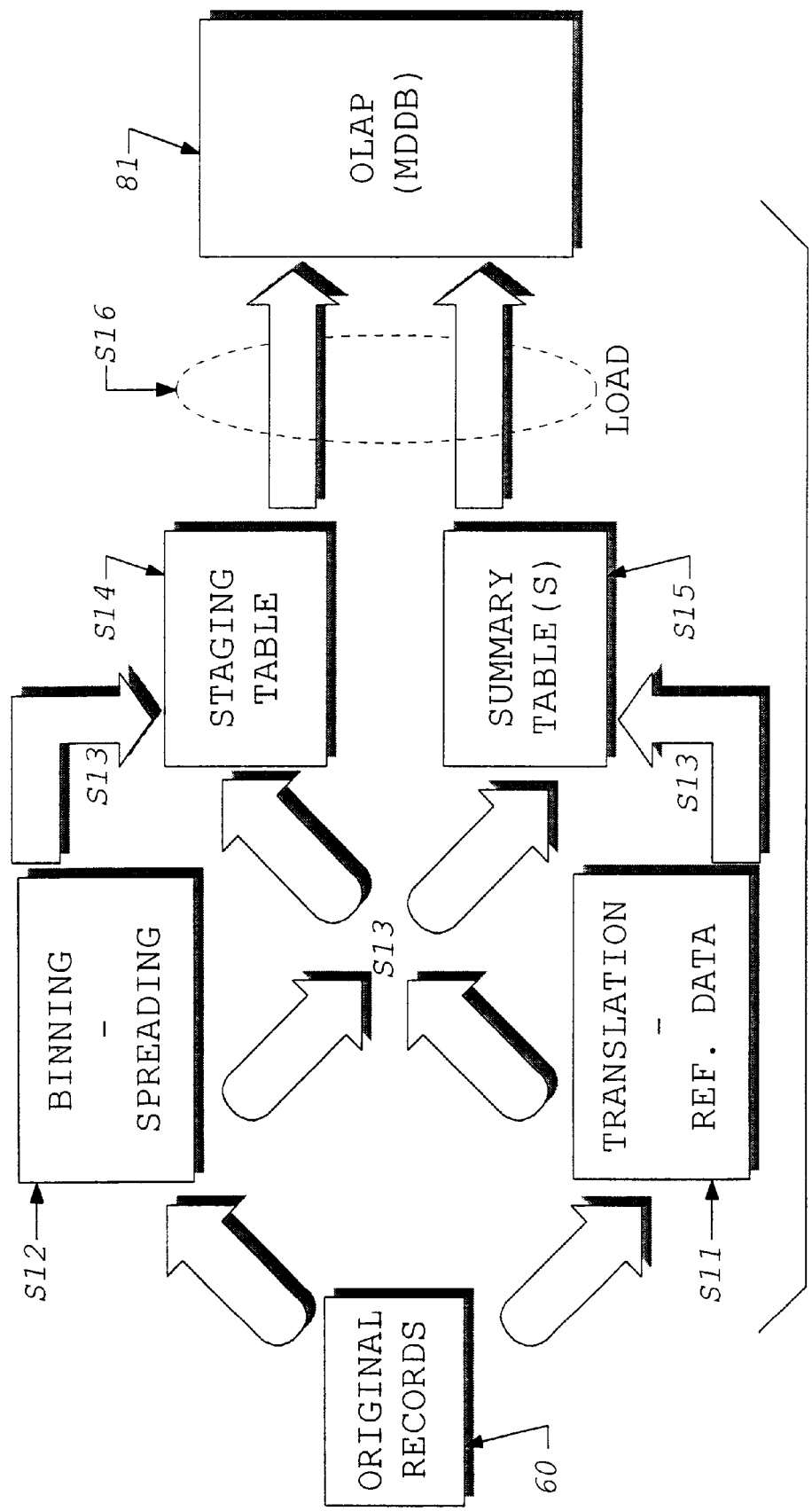
FIG. 5 is a flow chart useful in explaining the operations involved in preparation of data for a study.

FIG. 5 is a high-level process flow diagram depicting the operation of the data preparation routine 71. Data preparation involves essentially three major functions, data translation, binning and assignment of records to tables.

Thus, in the drawing, the original records from the relational database 60, either SS7 CDRs or AMA records, can be translated using external reference data (S11). The data preparation program 71 also executes an algorithm for binning or spreading of usage data from the records, to properly allocate usage that may extend over multiple hours to the appropriate hourly time periods (S12). At step S13 (shown as multiple transfer arrows) the enhanced records resulting from the translation (S12) and the binning (S13) are compiled into one or more predefined tables.

In the illustrated embodiment, the data preparation program 71 generates a staging table (S14) and one or more summary tables (S15). The staging table contains the complete enriched record information, whereas a summary table contains a more limited set of information to provide a desired summary of certain aspects of the traffic. At S16, the data preparation routine 71 uploads the resulting tables into the OLAP program, in the preferred embodiment, the MDDB 81.

A more detailed description of the major functions of the data reparation procedure may be found in commonly assigned application Ser. No. 09/188,713 entitled DATA PREPARATION FOR TRAFFIC TRACK USAGE MEASUREMENT, and the detailed disclosure of that procedure from that application is entirely incorporated herein by reference.

The data preparation routine may be written in PL/SQL language. The data preparation routine preferably runs on the same computer that maintains each particular relational database and effectively runs on top of the relational database application. The data preparation process accesses additional reference data 73 that may reside in the same or a separate computer system.

As noted, one function of the data preparation relates to enhancement of the raw data by application of external reference data 73. Typically, the reference data provides a translation of the data elements from a raw form to some more useful form. For example, in this process, the software takes the SS7 address information, the origination and destination point codes, and accesses associated reference data 73. The reference data might include an inventory of all of the SS7 point codes. The data preparation routine 71 would translate the point codes into the Common language location identifier (CLLI) codes for identification of the serving switches.

This data preparation operation of software 71 may operate mainly on the data from the SS7 relational database 61. Those skilled in the art will recognize, however, that a similar data preparation operation may apply to data uploaded from the AMA relational database 63. The data preparation for either SS7 or AMA might translate the NPA-NXX of either the dialed or calling party number into an identifier for the carrier and/or the CLLI code for the specific switch. In some cases, specific numbers may be translated into identifications of the actual subscriber, for example to identify a party believed, to be operating as an ISP.

Another major function of the data preparation process 71 is to "bin" the calls by hours of the day. For engineering purposes, it is important to know traffic loads by hours, particularly to identify typical peak busy hours and determine loads during such hours. Categorizing calls and CDRs by hours is significant here because CDRs often relate to calls that can span hours. For these reasons, a significant operation of the data preparation process is to make sure that the calls are binned into the hours of the actual usage. For example, an Internet access call might start from PC 7A to ISP 7C at 8:15 PM and last until release at 10:20 PM. As such, the start-time hour would be the hour from 8 to 9 PM, but all those minutes of use should not appear to in that one hour. The binning process allocates 45 minutes of use in the 8 to 9 o'clock hour, 60 minutes in the 9 to 10 o'clock hour, and then 20 minutes in the 10 to 11 o'clock hour. To achieve this accurate binning of calls from the CDRs, the data preparation operation goes through every single CDR, examines the start time and duration and applies minutes of usage into the right hour of the day.

The data preparation stage 71 also assigns each AMA record or SS7 CDR to one or more tables, according to application type. For example, for the SS7 CDRs, a "staging" table is the primary table used for binning all the calls and then forwarding to a second table or to a third table for summaries prior to input into the Gentia implmentation of the MDDB 81. Other commonly used SS7 CDR tables include an "Office_Pair" table for tandem studies, an "Office_Summary" table for end office studies, and a "PIU" table for studies of the percentage of internet usage in comparison to the percentage of local usage.

The data preparation function is an automatic process. Although there are some common aspects for all studies, data preparation actually is adapted to different types of studies.

To enable the automatic data preparation function, as part of the initial set-up of a study, the CDR data from particular sources is pointed at the appropriate data preparation function based on the study-type flag in each CDR. In a tandem study of ISP traffic, for example, the data captured by the SS7 monitors 31 and the site processor 35 relating to calls routed through that tandem would go through the ISP traffic analysis version of the data preparation process when being transferred from the SS7 relational database 61 to the multi-dimensional database 80.

Each study runs for some pre-determined period of time selected by the user. The results, however, are available in real or near real-time. The process could take several days or a week, depending on available processing power. Preferably, the results will be available overnight. For example, if a user sets up a study on ISP traffic into the end office 13 for Sep. 10, 1998, the study begins at midnight, data is uploaded to the relational databases periodically for the 24-hour period on that date. The SS7 and/or AMA data records are collected into the landing zones at midnight and uploaded into the relational databases. Then the data preparation for the new CDRs begins at one o'clock (AM) the next morning and finishes loading into the MDDB about four o'clock (AM). The results of the study are available to the user at the beginning of the next business day, e.g. nine AM Sep. 11, 1998. For a study over a longer period of time, e.g. a month long study, the user can access the latest results each morning.

The web suite software 85 together with the MDDB software 81 performs all necessary OLAP processing. As part of this function, the software implements a Data Collection and Study Management Tool set, which enables the user to set up and control studies using the traffic track system. The detailed description of this Tool set from the above cited Ser. No. 09/188,713 copending case is incorporated herein by reference.

In an environment where there will not be constant and simultaneous data collection from all links off of each site processor, the system operates under the concept of a "study". This study concept is the means or unit of requesting data collection. As noted, each study needs to be assigned a unique identifier and a "type" flag. The study is the trigger for activating specific sites/links and for identifying the application(s) or model(s) needed for analysis. As such, the study triggers activation of specific application loader processes between the relational databases and the corresponding application in the MDDB.

The specific per study details are presented to the user such that the user can choose a study and then go directly into the application for that study. The user also has the option to be able to do cross study analysis within the application (where appropriate).

As part of the study management processing, each study is assigned an identification number, during initialization. The site processor 35 includes the appropriate study identifier in the CDRs compiled from the SS7 messages. Similarly, the billing system 41 includes study identifiers in AMA detail records, which it forwards to the relational database 63. The landing zone processing uploads the records into relational tables, corresponding to the study identifier. The data preparation operation 71 also prepares the data as required by the parameters for the particular study number and loads the data into the appropriate study tables within the MDDB 80. The OLAP processing allows a user to select an application, view a list of studies having a type identifier corresponding to the application, and then select and access results of one of those studies.

In the OLAP software 80, the operators set up models for different types of studies, e.g. an ISP finder and an Internet traffic analysis. The models control the collection of the data and provide standardized screens for access and display of the processed data by the MDDB. The MDDB software 81 thus allows the developer to go in and generate his own tables for presentation, to enable customized visual development.

The MDDB receives the enriched SS7 and/or AMA call detail records. Using the pre-defined model for a particular type of study, the application running in the MDDB 81 goes through the records, picking out information as needed to form the tables for a new study. The study tables are what is actually stored in the MDDB database. The enriched call detail records are then discarded. As such, the MDDB processing effectively compresses the amount of data. However, the relational databases 61, 63 are still in existence, and it is possible to drill down from the MDDB to CDRs in the relational databases. For example, an ISP traffic study might identify the offices originating large amounts of traffic to an ISP's number. Using a drill-down operation, it is possible to identify the calling parties (by calling party number) with heavy minutes of usage from the CDR data in the relational databases.

The data preparation and CDR discard runs in a cycle. For example, in a tandem study application, there is never a reason to go down to the CDRs. Once the system runs through the CDR data preparation and loads the information into the MDDB, the enhanced CDR and the raw CDR in the relational storage can be discarded. In current implementations of the tandem study, every night the data preparation begins at one o'clock (AM) and finishes at four o'clock (AM). Records are purged after the data preparation. CDRs for the next day are collected into the landing zone again at midnight, and they are uploaded into the SS7 relational database. Then the data preparation for the new CDRs begins again at one o'clock (AM) the next morning. For an ISP finder study, there may be a need to archive the records, to allow drill-downs for later research. If necessary, the raw or enhanced AMA and SS7 records can be archived, in off-line storage, before purging.

The MDDB 81 analysis based on SS7 CDRs also enables the user to look at uncompleted calls. For every inter-office call that does not complete, the release message includes a cause code that indicates why it was not completed. For example, the code for 'no circuit available' means that there was no trunk available in the tandem. The code 'user busy' means a busy condition at the destination. The SS7 CDRs include the cause codes for the uncompleted calls, and the OLAP processing in the MDDB 81 allows analysis and displays using those codes.

Figure 6:
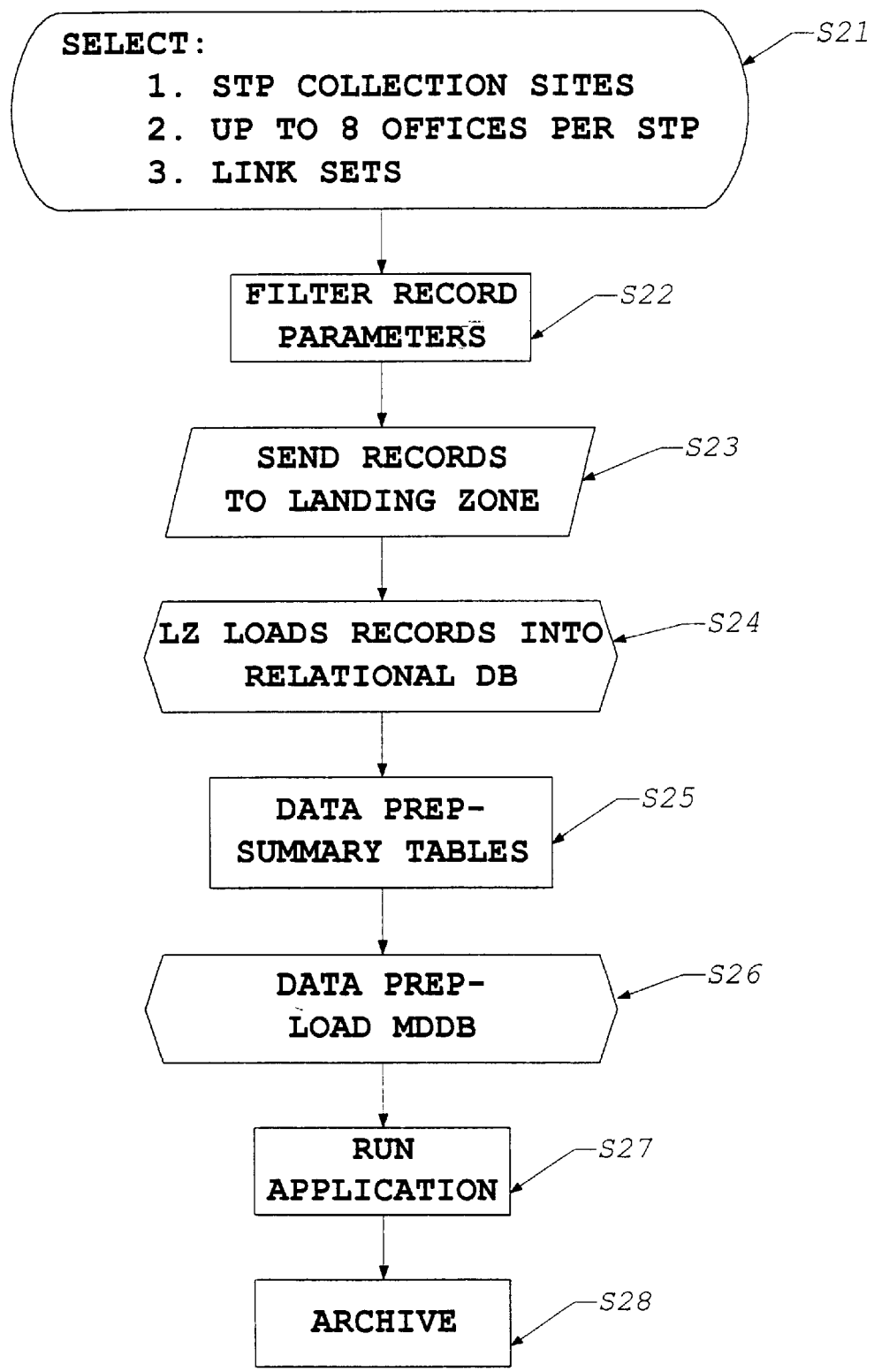
FIG. 6 is a flow chart illustrating the high-level process of overall management of a traffic track study.

FIG. 6 is a flow chart depicting the overall flow of study management, including management of ISP finder studies and related traffic studies, using the traffic track system of the present invention. Most aspects of the process flow have been discussed above in considerable separate detail, but it may be helpful at this point to recap by considering the overall study flow.

As shown at step S21, the process essentially begins with the user inputting a number of study selections. For an SS7-based study, for example, this would involve input of the three selections shown, the STP collection sites, a number of offices associated with each STP (up to 8 per STP) and the link sets to be monitored.

The network elements monitor the records, and filter the records by parameters (S22), based on the input selections. In the SS7 example, the monitors 31 supply messages through the card cages 33 to the site processor 35. The site processor 35 compiles CDRs, and based on the CDR parameters, filters the CDRs to match the user selections. In step S23, the monitoring equipment, e.g. the site processor 35, transmits the records (CDRs) to the landing zone 50. The landing zone process 50 loads the records into the tables for this study established in the appropriate relational database 61 or 63 (step S24).

The data preparation routine 70 prepares the staging and summary tables (S25). As discussed above, this includes the various translations using reference data, binning or spreading of records to properly allocate usage time and loading of data into the appropriate tables. The data preparation routine 70 then loads the tables into the MDDB 81 (S26). Within the MDDB software, a study application is run to present the data to the user (S27). The study application corresponds to the particular type of study, e.g. tandem, ISP finder, CLEC, etc. The study results also are archived (S28) for future reference. If necessary for the particular study, e.g. for CLEC billing reconciliation, the archiving may include the original record data from the relational databases.

Although not shown, upon completion of the particular study, the application running on the MDDB may enable the user to access other data 83. For example, in an application which identifies end user telephone numbers, such as an ISP finder application or an Internet user finder application, such other data sources 83 might provide the name and address of each identified user. This might enable the LEC to market certain services to the identified parties. Examples of such other databases 83 include CRIS, LMOS and LIDB (Line Identification DataBase).

Figure 2B:
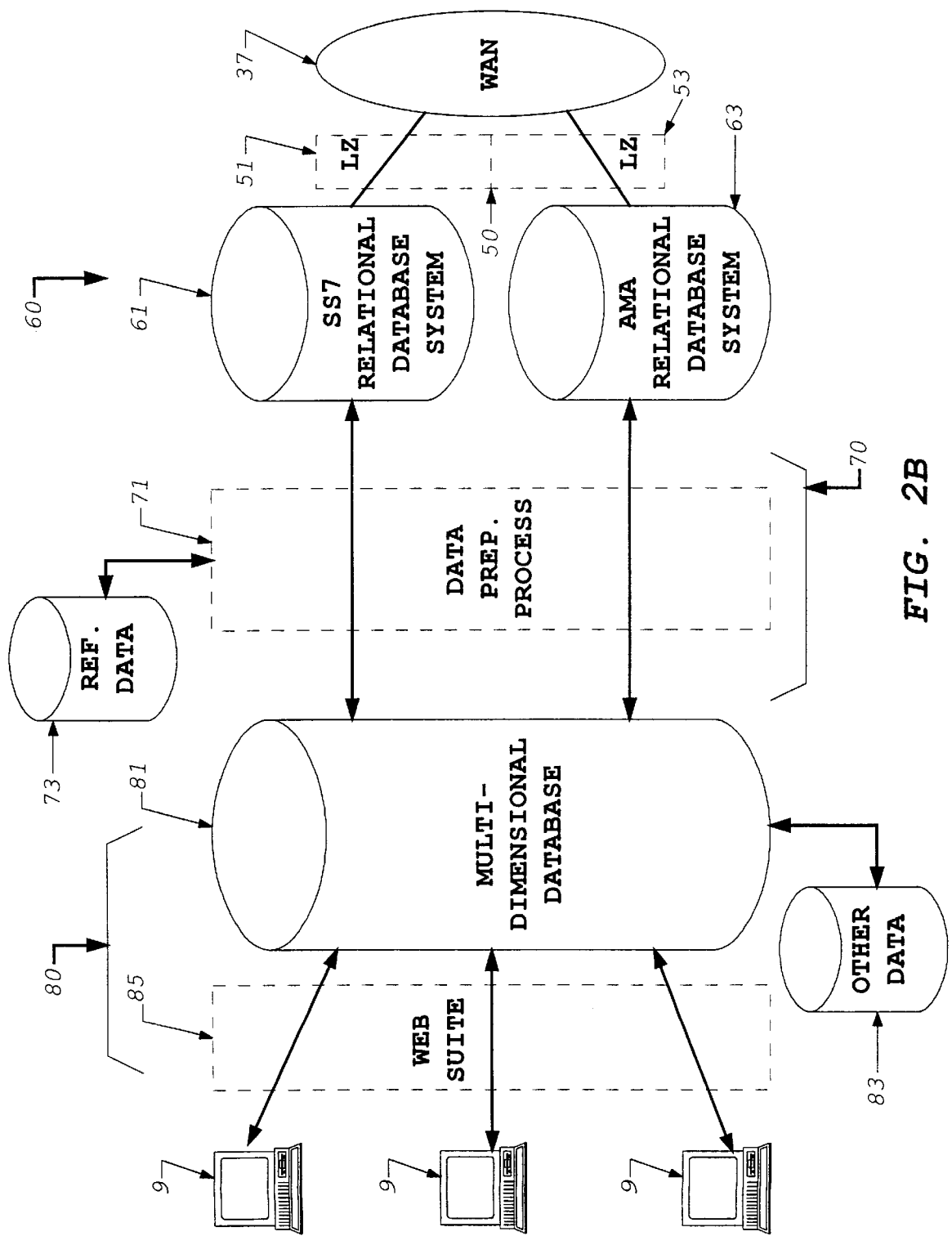

Using the methodology of FIGS. 5 and 6 on the system of FIGS. 2A and 2B, the carrier can run a wide range of studies regarding traffic through the network. In accord with the invention several of these studies relate to Internet access traffic. For purposes of this case, the most relevant is the ISP finder study, but several other studies utilize results from the ISP finder. We will consider implementation of these studies in detail. Consider first the ISP finder.

The ISP finder program analyzes traffic information; from AMA records or CDRs compiled by monitoring signaling messages, to identify certain patterns that are unique to Internet. The study is set against one or more end office switches, so as to collect calls going to or from those switches. Such a study using AMA will identify intra-switch Internet calling as well as inter-switch Internet calling. First, the translation software is activated in the relevant offices to set up the switches so each switch generates AMA call detail records for every call made out of the switch, even if it's a non-toll call. The finder routine then involves studying those records to identify calling patterns corresponding to Internet traffic.

First, the routine looks at the busy hour, and within that hour, it identifies terminating numbers with a large number of calls from the peg count. Peg count is the number of calls to the number. From AMA records, the peg count represents completed calls. From SS7, the peg count represents all originated calls, whether completed or not. Next, for the terminating numbers with a large volume of calls, the routine determines the average hold time for calls to each number. The routine then identifies those terminating numbers that also have average hold times over a threshold value, e.g. eight minutes per call.

At this point in the routine, there is an evaluation of the type of traffic for each identified telephone number. Essentially, the routine determines if the traffic was incoming and that there were no calls originating from the identified number. If so, the routine identifies the number as that of an ISP. Studies conducted to date using this routine have identified numbers that 95% of the time are in fact ISP numbers. If a further verification is desired, a technician can call each number and determine if the call is answered by a modem.

An inventory 83 of all the ISP access numbers identifies all such numbers found to date. Initially, the inventory includes numbers of known ISPs derived from other sources, such as lists of access numbers posted on the Internet or the LEC's customer records. The inventory can be compared against the numbers found by the ISP finder study, to correlate traffic to known ISPs. Numbers that do not match the inventory are compiled as candidates in a list of "New" ISP access numbers. Numbers identified in the finder study but not already in the inventory are added to the inventory for future reference.

Other types of common calling patterns do not fit the ISP model with large numbers of incoming calls during the busy hour, long average hold times and no originating traffic. For example, calls to an automated system for credit card checks are short duration. Business facsimile numbers often originate traffic and typically occur during business hours, not during the evening busy hour produced in many offices today by Internet access. Bookie operations are short duration.

The other unique type of new traffic that this ISP Finder can identify relates to IP telephony services, in which people call IP access numbers and then make long distance calls using the Internet in place of an interexchange carrier. The user dials the access number and receives a voice prompt. The user inputs a credit card number or some other billing account number and a destination address. The ISPs equipment then initiates communication through the Internet to a distant node, which completes the call through another local telephone network. Use of the traffic track methodology enables the LEC to determine how such traffic is growing. From that information, the LEC can determine how such a bypass service is eroding the LEC's long distance interconnect services, and the IXC can determine how mush long distance traffic it is losing to ISPs.

A preferred methodology for implementing ISP identification and location may be accomplished in the following manner.

1. Designate an end office or tandem switching system known to be encountering congestion.
2. Program the monitoring and analysis system and set the switch translations to generate call detail data for that switch, at least during designated hours known to be peak traffic hours (Preferred). In the system illustrated in FIG. 2A the tandem office 17 may be selected.
3. Trap all SS7 messages and record all AMA details for calls through the office during the designated hours. (Optional)
4. Assemble the data from the collected data and process and compress that data to form CSV (comma separated values) flat files in the SS7 and AMA databases.
5. Perform a statistical analysis and determine which numbers had the most calls made to them, which called numbers had the most minutes of use, which called numbers had the longest hold times, and which called numbers also are associated with no originating traffic.
6. Automatically call the numbers thus identified and ascertain which are answered by modems. These represent ISPs, such as the ISP $7_c$ served by the CLEC network $3_2$.
7. Compare candidate ISP numbers to a list of known ISP number to identify new ISP numbers. Add new ISP numbers to the list of known ISP numbers.
8. Identify the locations of the ISPs within the end office switch(es) from Telco records or from further translations of the numbers in the CDRs using external data 83.

The information obtained from this analysis identifies the destination numbers and possibly the office equipment connections for those numbers, associated with ISPs. The follow-up studies, such as the ISP traffic analysis and the Internet User Finder provide an indication of the routes experiencing difficulties and enable strategic planning to eliminate or at least ameliorate the difficulties. For example, attempts may be made to have distressed users install ADSL or other digital subscriber line equipment. Alternatively or conjunctively a Telco data link, such as T1 or other equivalent, may be established from the end office established as handling the bulk of the overload calls directly to the ISP equipment.

It should be noted that the ISP number finder methodology outlined above applies to any calls routed through the LEC's network, regardless of whether or not the calls actually reach a destination within that network. For example, it is possible to set up an ISP finder study on the links around the STPs 21, 23, as shown in FIG. 2A; and such a study will generate CDR data for all calls from ISP users 7A within the LEC network. The CDR processing captures the data for calls, whether the calls terminate at ISP equipment 7B in the LEC's network 31 terminate at ISP equipment 7c in the CLEC's network 32.

Another issue that arises is reciprocal compensation for CLECs. In particular, problems arise over compensation relating to Internet access traffic. LECs argue that these calls should not be subject to reciprocal compensation because they are not intra-LATA calls, under the definition of the Telecom Act. A call bound for the Internet should be an inter-LATA call. Prior to the invention, there was no way to measure such calls from a LEC to an ISP subscribing to telephone service through a CLEC. As dicussed above, one application of the traffic track technology relates to finding ISP telephone numbers (see ISP finder notes). This approach actually finds ISP numbers even if served through a CLEC. Having identified the ISP numbers within the CLEC network, a study of the traffic across the trunk connections between the LEC network $3^1$, and the CLEC network $3_2$ can determine the percentage of calls that the LEC terminates to the CLEC that actually are Internet related.

For example, in one study of a CLEC during one 24-hour period, 28% of the traffic, the MOU, was Internet bound. Potentially the LEC could discount 28% of the reciprocal compensation if the LEC had a ruling from the utility commission conceding that such calls are not subject to reciprocal compensation.

The results displayed from one of the studies of ISPs served through a CLEC showed the top 15 ISP numbers found, the minutes of use (MOU), the peg count (number of calls) and the average hold time. The average was calculated simply by dividing the MOU by the peg count. This actually results in a low average, because the raw peg count derived from SS7 signaling messages includes calls not completed to the ISP equipment, e.g. because of a busy destination or lack of available circuits.

The Finder program may work at the front-end level, actually almost at the raw data level of CDRs in the AMA and SS7 relational databases. Once the finder program identifies potential ISP numbers, the MDDB provides a presentation using the "sliced and diced" data at the aggregate level, to show the pattern of calling. The user can choose different dimensions to review.

The finder program preferably is written in Structured Query Language (SQL) language and generally operates directly on the particular relational database 61 or 63. In the preferred embodiments, the relational databases are Oracle databases. The Gentia MDDB preferably performs the OLAP processing, including the user interface functions to enable a user to execute the finder application and related programming. The user could write queries directly against that relational database, but preferably, the user interacts with the MDDB, and the MDDB launches the appropriate queries. For example, if study data is collected for traffic through the end office 13, the MDDB program will translate an ISP finder request to an SQL command. The command might initiate an SQL query to drill-down into a selected record set and find any terminating number that had a peg count greater than 1200 and an MOU more than 3600 (large traffic, long hold times), or whatever the user selects for threshold values.

Having identified the ISPs, the traffic track system allows the user to analyze considerable information regarding the ISP traffic. For example, it is possible to drill down into the relevant SS7 CDRs to identify calls from users to the ISP access numbers that went uncompleted and identify the blockage patterns encountered by those customers on uncompleted calls. The CDRs also include a release code and a field identifying the element that generated the cause of the release code. For example, if there were no trunk available through a particular tandem, as indicated by the release code, the CDR would also identify the tandem. Using this information, for example, the marketing department might show the ISP 7C the number of blockages caused by problems of inadequate service provided by the elements 15, 17 of the CLEC network 32 and offer that ISP better-service through advanced features available on the LEC network 31.

A release code indicating "no circuit available" in a CDR means that no trunk circuit was available out of the tandem for which the site processor collected the CDRs. If the LEC is collecting CDRs for traffic through the tandem 17, a "no circuit available" code indicates that there was no trunk available out of that tandem 17. However, if there are no circuits available at some point in the CLEC network, it shows up as a different release code, such as a "resource unavailable" code or one of the other types of failures.

As another example, consider the situation if the ISP 7B complains of poor service. The LEC 31 might study the blockages to all of the numbers found for that ISP. Under some circumstances, the LEC might counter the ISP's complaint by showing that many of the blockages are a result of the ISP having too few modems and lines associated with calls for the identified number(s).

As shown, the traffic track system allows further analysis of traffic from the traffic data, after the finder identifies the ISP access numbers. The preferred embodiment includes several applications and models for such further Internet studies. It may be helpful at this point to consider several other specific study applications that run on the system of FIGS. 2A and 2B and are related to or utilize data from the inventive ISP finder study.

Another relevant application determines the % ISP traffic in relation to total traffic for an identified End Office. There is one basic study configuration, i.e. for full office collection of all originating AMA records. The data sources for this application preferably include: full office collection of originating AMA CDRs (Call Detail Records), ISP Collection of terminating AMA CDRs, and Office CLLI code tables from the reference data.

The information output of this application may include:
A) Distribution of the traffic as a percentage of internet traffic compared to total office traffic;
B) Internet traffic as a specific ISP or the set of known ISPs out of the end office; and
C) The percent of traffic by:
 1. MOU
 2. CCS
 3. peg count (# of calls)
 4. Hourly, Daily, Weekly The data analysis process for the % ISP traffic analysis study is as follows:
1. Select a list of identified ISP numbers in a switch.
2. View the aggregate originating traffic calling the ISP number(s) for a 24 hour period.
3. Aggregate all usage (all calls for the end office regardless of termination #).
4. Create a graph display of the % distribution of total traffic vs. ISP traffic—total minutes of use, peg count or CCS——hourly, daily, weekly.

Another related Internet analysis application is the ISP Analysis Tool. This tool is necessary for understanding and responding to the effects of the Internet users and Internet Service Providers. This tool performs traffic data analysis to identify potential ISP services/facilities and provide details on the volumes and characteristics of that traffic. For this application, the analysis should produce the following Information:

I. Identifies of the Internet Service Providers that are operating out of a given end office(s)
II. Identify and understand the internet traffic volumes and usage characteristics to these ISP's (from the ISP vantage point) on a daily, hourly basis; trend this data over a weekly, monthly perspective.
III. Locate Heavy Internet Users and detail their usage and calling patterns—to specific ISP(s) and for a defined region or area (i.e. out of specific end offices).
IV. Identify this distribution of traffic and call flow patterns from specific originating offices to given ISPs.
V. Profile the usage distribution to ISPs from all end offices involved in the study on a daily and hourly basis.
VI. Compare total Internet traffic volume with total traffic volume.

Preferably there are two basic study configurations, one for a full office collection of all originating AMA records and another for collection of all terminating AMA records to specified ISPs. The ISP analysis uses data sources including full office collection of originating AMA CDRs, ISP collection, of terminating AMA CDRs, and Office CLLI Code Tables from the reference data.

The collected data may be used for any of the five ISP Analysis tools, as well as an Ad Hoc analysis. The five tools are:

1. ISP Finder—using known call characteristics, identify terminating # that are potential terminating data services
2. ISP Hourly—present the hourly and daily calling patterns and usage characteristics of the ISP traffic
3. High Internet User Finder and Analysis—finding and providing detail statistics for the individual lines with the highest usage.
4. Communities of Interests—distribution of traffic to the ISP from the area end offices
5. % ISP-to-% Total traffic analysis—total study traffic, total end office traffic A comprehensive ISP analysis process would involve the following steps:

1. Start with full office data
2. Run ISP Finder
3. Use ISP Finder results to run ISP Hourly Trends to understand the particular aggregate usage patterns
4. Run a Communities of Interest analysis to identify the originating end offices with the most usage
5. With the "hot spot" end offices identified, use High Internet User Finder to identify the highest originating users and their usage patterns.

To recap, for the ISP finder routine, the user specifies some sort of a time period for the study and the offices of interest. The program then collects call records for all traffic into or out of those offices. Of note, the records include the terminating numbers. The program identifies the terminating numbers where the traffic data meets certain criteria in terms of number of calls within the period and minutes of use. The number of calls is the preferred indication of a high volume of traffic. The minutes of use and the number of calls translate into a particular average hold time, which also may be used as a threshold value. This may be set up to identify any number with a peg count higher than a threshold and an MOU higher another threshold, which means a hold time average higher than some significant amount of time. Typically, the user sets the program thresholds to look for average hold times longer than eight minutes. The program then checks to determine whether or not each number identified as having large number of calls and a long hold time average originated any calls. If not, there is a 95+% probability that the number is an ISP access number.

For a finder of a different type of service, e.g. calls to a prepaid calling card service, the thresholds would be set up to look for a different average hold time, e.g. under 30 seconds in the calling card example.

As discussed, the invention meets a need to find specific patterns of traffic, for example to identify ISPs. There also is a need to find other frequently called users, like calling card service owners, prepaid calling card numbers, credit card verification systems, and the like. For example, the LEC should be getting revenue for calls made to prepaid calling card numbers, for example from a coin phone. There is an arrangement where the LEC is supposed to receive 20 cents or 25 cents for every call from a coin phone to a prepaid calling card number. However, this is limited to only for those calls that the LEC can record in its billing system. If the call is under 40 seconds, existing billing systems never record the call. The LEC needs to find such calls. In essentially a reverse of the ISP finder routine, the invention can identify numbers that received a large volume of terminating calls but had real short duration calls, for example, 50,000 calls that all lasted under 30 seconds. In sample studies of this type, it was found that the numbers were to pre-paid calling card systems.

The inventive traffic track system identifies the telephone number. Once the traffic track system has identified the number, the system could automatically send them to the LMOS database or something like that and obtain information. LMOS or the like would initiate a test of the line associated with the number, to see what is on the end of the line and automatically qualify the line as that of a calling card system. To recapture the revenues, the LEC then modifies the switches and billing system to measure those calls to such numbers, which were from coin phones, even if under 30 or 40 seconds.

The traffic track technology described in detail above has applied to analysis of the call traffic through the PSTN. However, the technology may be adapted to study other types of telecommunication networks, such as cell or packet data networks, cellular networks, etc.

As described above, the SS7 monitoring system traps, messages from identified links going to and from the STPs initially compiles records from those messages at the site processor level. Other forms of monitoring of the interoffice signaling fall within the scope of the invention. For example, the function of the site processors might be rolled up into processor functions on the card cages. Also, a number of STP vendors have products that can supply message copies to monitoring ports, such that the STP itself performs the trapping function.

From the foregoing it may be seen that the system and methodology of the invention provide a powerful and flexible tool for performing varying investigations and surveillance. Thus, as examples, it is feasible to identify ISPs, determine the source of the largest amount of traffic to the identified ISPs, and the optimal solution to the Internet related overloading.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method comprising the steps of:

analyzing data records of calls through a telecommunication network to identify destination telephone numbers receiving a high volume of incoming traffic from a plurality of users;

for the identified destination numbers, analyzing data records for calls to those numbers to determine number of calls from users made to each of the identified telephone numbers and total amount of connect time for the calls from users to each of the identified numbers; and collecting a subset of the identified telephone numbers as candidate numbers, wherein each one of the identified telephone numbers is included in the subset as a candidate number if the number of the calls from users and the total amount of connect time for the calls from users to the one identified telephone number satisfy criteria indicating a target traffic pattern.

2. A method as in claim 1, wherein:

the criteria comprises a relationship between the number of calls and the total connect time for calls to the one identified telephone number signifying a long average hold time; and the target traffic pattern relates to data calls through the telecommunication network.

3. A method as in claim 1, wherein the criteria comprises a relationship between the number of calls and the total connect time for calls to the one identified telephone number signifying a short average hold time.

4. A method as in claim 1, wherein the step of analyzing data records to identify destination telephone numbers receiving a high volume of incoming traffic comprises:

analyzing number of incoming calls to each destination telephone number within a predetermined interval; and identifying destination numbers having a number of incoming calls exceeding a threshold value.

5. A method as in claim 1, wherein the step of analyzing data records to identify destination telephone numbers receiving a high volume of incoming traffic comprises selecting a predetermined number of destination telephone numbers receiving the highest number of incoming calls.

6. A method comprising the steps of:

analyzing data records of calls through a telecommunication network to identify destination telephone numbers receiving a high volume of incoming traffic;

for the identified destination numbers, analyzing data records for calls to those numbers to determine number of calls made to each of the identified telephone numbers and total amount of connect time for calls to each of the identified numbers;

collecting a subset of the identified telephone numbers as candidate numbers, wherein each one of the identified telephone numbers is included in the subset as a candidate number if the number of calls and the total amount of connect time for calls to the one identified telephone number satisfy criteria indicating a target traffic pattern;

for each candidate number in the subset, analyzing data records of calls through the telecommunication network to determine if there were any outgoing calls from a station associated with the candidate number; and deleting any candidate numbers from the subset if there were any outgoing calls from a station associated therewith.

7. A method as in claim 1, further comprising:

accessing reference data; and using the reference data to translate an item of information from a data record of a call to each respective candidate number in the subset into descriptive information.

8. A method as in claim 7, wherein the descriptive information identifies an office of the telecommunication network assigned to provide switching services relating to the respective candidate number in the subset.

9. A method as in claim 7, wherein the descriptive information identifies a subscriber that has been assigned the respective candidate number in the subset.

10. A method for identifying destination telephone numbers as candidate numbers believed to be associated with a particular type of business, comprising the steps of:

compiling records of calls through a portion of a telecommunication network from management data of the network, the records comprising data identifying start time, duration, and destination number of each call; and analyzing the records of calls to identify each destination number satisfying predetermined criteria as a candidate telephone number, the predetermined criteria comprising:

a high volume of incoming calls to the destination number during a predetermined interval, and calls to the destination number exhibit an average hold time bearing a predetermined relationship to a threshold value of duration.

11. A method as in claim 10, wherein the predetermined criteria further comprises a requirement that substantially all calls for the destination number were incoming calls, such that there were substantially no calls from a station associated with the destination number to another number.

12. A method as in claim 10, further comprising:

accessing a list of known destination numbers associated with the particular type of business; and eliminating any candidate number found on the list of known destination numbers.

13. A method as in claim 10, wherein the management data comprises interoffice signaling messages, and the step of compiling records of calls comprises:

monitoring signaling messages regarding call processing exchanged between offices of the telecommunication network; and processing a plurality of the signaling messages regarding each call through the portion of the telecommunications network to form a call detail record of significant data regarding each call.

14. A method as in claim 10, wherein:

the management data comprises accounting messages regarding calls processed through offices of the telecommunication network generated by the offices; and the step of compiling records of calls comprises processing a plurality of the accounting messages regarding each call through the portion of the telecommunication network to form a call detail record of significant data regarding each call.

15. A method as in claim 10, further comprising the step of initiating a call to each candiate telephone number to determine if an answer condition satisfies a predetermined characteristic.

16. A method as in claim 15, wherein the predetermined characteristic comprises an answer by a modem.

17. A method as in claim 10, wherein the predetermined relationship of the average hold time is that the average hold time meets or exceeds the threshold value of duration.

18. A method as in claim 17, wherein the particular type of business comprises an Internet Service Provider.

19. A method as in claim 18, further comprising the step of initiating a call to one candidate telephone number to detect answering by a modem as a confirmation that the one candidate telephone number serves an Information Service Provider.

20. A method as in claim 10, wherein the predetermined relationship of the average hold time is that the average hold time is less than or equal to the threshold value of duration.

21. A method as in claim 10, wherein the step of compiling comprises forming the records of call from management data of the telecommunication network and loading the records of call management data into a database.

22. A method as in claim 21, wherein the step of analyzing comprises:
   enhancing the records of call management data in the database;
   loading the enhanced data into an on-line analytical processing system; and
   running an application on the on-line analytical processing system to present an analysis of the enhanced data identifying destination telephone numbers as candidate numbers believed to be associated with a particular type of business.

23. A method as in claim 22, wherein the enhancing step comprises, for any calls processed by the telecommunication network extending over two or more predetermined time intervals, binning usage data from the records for those calls in accord with actual usage within each interval.

24. A method as in claim 10, wherein the analysis of the records of calls to identify each destination number having a high volume of calls during the predetermined interval comprises:
   analyzing the records of calls through the portion of the telecommunication network to identify a peak busy hour; and
   analyzing the records of calls to identify each destination number having more incoming calls than a threshold value during the peak busy hour.

25. A method as in claim 10, wherein analysis of the records of calls with respect to average hold time of calls to a predetermined number comprises:
   counting number of calls initiated through the telecommunication network to the predetermined number;
   determining the total usage time for calls completed to the predetermined number; and
   calculating the average hold time for calls to the predetermined number by dividing the total usage time by the counted number of calls.

26. A method as in claim 10, further comprising the step of:
   obtaining one item of information from a record of a call to one of the candidate telephone numbers;
   accessing reference data; and
   using the reference data, translating the one item of information into descriptive information.

27. A method as in claim 26, wherein the one item of information is the one candidate telephone number, and the descriptive information is the name of a subscriber associated with the one candidate telephone number.

28. A system, for use with a telephone network, for identifying destination telephone numbers as candidate numbers believed to be associated with a particular type of business, comprising:
   means in communication with elements of the network for compiling detailed records for calls processed through a portion of the telephone network; and
   a server system, in communication with the means for compiling, for receiving and analyzing the detailed records to identify each destination telephone number satisfying predetermined criteria as a candidate telephone number, the predetermined criteria comprising:
      calls to the destination number during a predetermined interval exceed a threshold, and
      calls to the destination number exhibit an average hold time bearing a predetermined relationship to a threshold value of duration.

29. A system as in claim 28, wherein the predetermined criteria further comprises a requirement that substantially all calls for the destination number were incoming calls, such that there were substantially no calls from a station associated with the destination number to another number.

30. A system as in claim 28, wherein the server system comprises:
   1) a landing zone routine;
   2) a relational database, wherein the landing zone routine loads the detailed records for calls into files in the relational database;
   3) a data preparation routine for processing the files in the relational database to enrich the information of the detailed records for calls in a manner facilitating the analysis;
   4) an on-line analytical processing routine receiving the enriched information; and
   5) at least one application running in the on-line analytical processing routine, for presenting results of the analysis based on the enriched information.

31. A system as in claim 30, wherein:
   the database comprises a relational database; and
   the on-line analytical processing routine comprises a multi-dimensional database.

32. A system as in claim 28, wherein the means for compiling comprises:
   monitors coupled to interoffice signaling links of the telephone network for trapping messages from the links; and
   a least one processor receiving the trapped messages and compiling data therefrom to form the detailed records for calls processed through the portion of the telephone network.

33. A system as in claim 28, wherein the means for compiling comprises a system for processing a plurality of the accounting messages regarding each call through the portion of the telephone network to form one of the detailed records.

34. A system as in claim 33, wherein the system for processing comprises a billing system of the telephone network.

35. A system as in claim 34, wherein the system for processing further includes switching offices of the telephone network for transmitting automatic message accounting information regarding calls processed through the portion of the telephone network to the billing system.

36. A method comprising the steps of:
   analyzing data records of calls through a telecommunication network to identify destination telephone numbers receiving a high volume of incoming traffic;

for the identified destination numbers, analyzing data records for calls to those numbers to determine number of calls to each of the identified telephone numbers and amount of connect time for the calls to each of the identified telephone numbers;

for each respective one of the identified telephone numbers, determining an average hold time from the number of calls to the respective identified telephone number and the amount of connect time for the calls to the respective identified telephone number; and collecting a subset of the identified telephone numbers as candidate numbers, wherein each one of the identified telephone numbers is included in the subset as a candidate number if the average hold time satisfies criteria indicating a target traffic pattern.

37. A method as in claim 36, wherein the criteria comprises a predetermined relationship of the average hold time to a threshold value of duration.

38. A method as in claim 37, wherein:

the predetermined relationship of the average hold time to a threshold value of duration is that the average hold time meets or exceeds the threshold value, and the target traffic pattern relates to data calls through the telecommunication network to a data network service provider.

39. A method as in claim 38, further comprising the step of initiating a call to one candidate telephone number to detect answering by a modem as a confirmation that the one candidate telephone number serves a data network service provider.

40. A method as in claim 37, wherein the predetermined relationship of the average hold time to a threshold value of duration is that the average hold time is less than or equal to the threshold value.

* * * * *